US006845396B1

(12) United States Patent
Kanojia et al.

(10) Patent No.: US 6,845,396 B1
(45) Date of Patent: Jan. 18, 2005

(54) METHOD AND SYSTEM FOR CONTENT DEPLOYMENT AND ACTIVATION

(75) Inventors: Chaitanya Kanojia, Newton, MA (US); Lee Kamenstky, Arlington, MA (US); Peter Hall, Ashtead Surrey (GB); Ian Copeman, Wokingham (GB)

(73) Assignee: Navic Systems, Inc., Needham, MA (US)

( * ) Notice: Subject to any disclaimer, the term of this patent is extended or adjusted under 35 U.S.C. 154(b) by 0 days.

(21) Appl. No.: 09/520,029

(22) Filed: Mar. 6, 2000

Related U.S. Application Data

(60) Provisional application No. 60/185,202, filed on Feb. 25, 2000.

(51) Int. Cl.[7] .............................................. G06F 17/30
(52) U.S. Cl. ...................... 709/224; 709/226; 709/232; 370/389
(58) Field of Search ................................. 709/206, 224, 709/225, 226, 228, 232, 217, 218, 220, 229, 227; 370/389; 705/14, 15, 24, 26; 707/102; 704/10

(56) References Cited

U.S. PATENT DOCUMENTS

| 5,099,319 A | 3/1992 | Esch et al. ..................... 358/86 |
| 5,481,542 A | 1/1996 | Logston et al. ............. 370/94.2 |
| 5,515,098 A | 5/1996 | Carles ........................... 348/8 |
| 5,539,449 A | 7/1996 | Blahut et al. ................... 348/7 |
| 5,583,563 A | 12/1996 | Wanderscheid et al. ...... 348/13 |
| 5,636,346 A | 6/1997 | Saxe |
| 5,646,676 A | 7/1997 | Dewkett et al. ............... 348/7 |
| 5,724,521 A | 3/1998 | Dedrick ...................... 709/224 |
| 5,740,549 A | 4/1998 | Reilly et al. .................. 705/14 |
| 5,774,170 A | 6/1998 | Hite et al. ...................... 348/9 |
| 5,818,438 A | 10/1998 | Howe et al. ................ 345/327 |
| 5,838,927 A | 11/1998 | Gillon et al. .......... 395/200.77 |
| 5,848,397 A | 12/1998 | Marsh et al. |
| 5,892,508 A | 4/1999 | Howe et al. ................ 345/327 |
| 5,915,243 A | 6/1999 | Smolen |
| 5,919,247 A | 7/1999 | Van Hoff et al. ........... 709/217 |
| 5,940,074 A | 8/1999 | Britt, Jr. et al. ............ 345/333 |
| 5,951,639 A | 9/1999 | MacInnis ..................... 709/217 |
| 5,961,602 A * | 10/1999 | Thompson et al. ......... 709/229 |
| 5,974,461 A | 10/1999 | Goldman et al. ........... 709/224 |
| 5,978,381 A | 11/1999 | Perlman et al. ............. 370/432 |
| 6,002,393 A | 12/1999 | Hite et al. ................... 345/327 |

(List continued on next page.)

FOREIGN PATENT DOCUMENTS

| EP | 1 071 287 A2 | 1/2001 |
| WO | WO 97/07656 | 3/1997 |
| WO | WO 99/52285 | 10/1999 |
| WO | WO 99/60504 | 11/1999 |
| WO | WO 99/66719 | 12/1999 |

*Primary Examiner*—Zarni Maung
*Assistant Examiner*—Khanh Quang Dinh
(74) *Attorney, Agent, or Firm*—Hamilton, Brook, Smith & Reynolds, P.C.

(57) ABSTRACT

The present disclosed system is directed toward a communication and management system that dynamically targets network devices for content deployment, such as application programs, device drivers, configuration files, and registry subhives. Moreover, the present system targets users of network devices for promotions, such as advertisements offered by Internet e-commerce sites. Promotions are generally icons or graphic images with links to host web servers overlaying a video display, but also includes audio and video clips or data streams. Network devices and their users are targeted through user profiles. User profiles are created when network devices register with the system server and are continually updated with information provided by user activity and event logs that are periodically uploaded from each device, a scalable messaging system provides for data transmission between the system server and among the network devices such that it is neutral as to the specific hardware platforms on which it is implemented.

38 Claims, 18 Drawing Sheets

U.S. PATENT DOCUMENTS

| | | | |
|---|---|---|---|
| 6,009,409 A | 12/1999 | Adler et al. | |
| 6,018,766 A | 1/2000 | Samuel et al. | 709/218 |
| 6,026,368 A | 2/2000 | Brown et al. | 705/14 |
| 6,038,561 A * | 3/2000 | Snyder et al. | 707/6 |
| 6,047,327 A * | 4/2000 | Tso et al. | 709/232 |
| 6,075,971 A | 6/2000 | Williams et al. | |
| 6,084,628 A | 7/2000 | Sawyer | 348/14 |
| 6,092,074 A * | 7/2000 | Rodkin et al. | 707/102 |
| 6,119,098 A | 9/2000 | Guyot et al. | 705/14 |
| 6,133,912 A | 10/2000 | Montero | |
| 6,182,050 B1 | 1/2001 | Ballard | 705/14 |
| 6,226,618 B1 * | 5/2001 | Downs et al. | 705/1 |
| 6,247,012 B1 * | 6/2001 | Kitamura et al. | 707/10 |
| 6,282,508 B1 * | 8/2001 | Kimura et al. | 704/10 |
| 6,293,865 B1 * | 9/2001 | Kelly et al. | 463/16 |
| 6,317,116 B1 * | 11/2001 | Rosenberg et al. | 345/701 |
| 6,345,256 B1 * | 2/2002 | Milsted et al. | 705/1 |
| 6,351,747 B1 * | 2/2002 | Urazov et al. | 707/10 |
| 6,363,356 B1 * | 3/2002 | Horstmann | 705/26 |
| 6,400,958 B1 * | 6/2002 | Isomursu et al. | 455/466 |
| 6,434,535 B1 * | 8/2002 | Kupka et al. | 705/24 |
| 6,434,747 B1 | 8/2002 | Khoo et al. | |
| 6,446,261 B1 | 9/2002 | Rosser | |
| 6,611,862 B2 * | 8/2003 | Reisman | 709/217 |

* cited by examiner

```
<?xml version="1.0" encoding="UTF-8"?>
<!ELEMENT EventLog(Event)+>
<!ELEMENT Event(gDevice, tTime, wsEventType, wsEventData)+>
<!ELEMENT gDevice(#PCDATA)>
<!ELEMENT tTime(#PCDATA)>
<!ELEMENT wsEventType(#PCDATA)>
<!ELEMENT wsEventData(#PCDATA)>
```

Fig. 5A

```
<?xml version="1.0" encoding="UTF-8"?>
<!DOCTYPE LoggerEvents SYSTEM "LoggerEvents.dtd">
<EventLog>
    <Event>
        <gDevice>E2CDBE0-6F85-11D3-BFFB-000039ABB70C</gDevice>
        <tTime>2000/02/04 18:31:02</tTime>
        <wsEventType>Channel</wsEventType>
        <wsEventData>53</wsEventData>
    </Event>

<Event>
        <gDevice>0000000-0000-0000-0000-000039ABB70C</gDevice>
        <tTime>2000/02/03 06:31:02</tTime>
        <wsEventType>Application</wsEventType>
        <wsEventData>Launched</wsEventData>
    </Event>
<EventLog>
```

Fig. 5B

METHOD AND SYSTEM FOR CONTENT DEPLOYMENT AND ACTIVATION

RELATED APPLICATION

This application claims the benefit of U.S. Provisional Application No. 60/185,202, entitled "System and Method for Targeting Network Devices for Content Deployment", by Chaitanya Kanojia, Lee Kamenstky, Peter Hall, and Ian Copeman, filed on Feb. 25, 2000, the entire teachings of which is incorporated herein by this reference.

BACKGROUND OF THE INVENTION

Generally, under the current state of technology and in the past, television has been delivered to the residential home either through radio-frequency broadcasts, satellite downlink, or over coaxial cable television (CATV) network. Data network communications, such as Internet access, have been delivered via the telephone networks through dial-up connections, ISDN (Integrated Services Digital Network), and DSL (Digital Subscriber Line) lines or over hybrid broadcast/data CATV networks, where a portion of the bandwidth transmitted by the coaxial cable is allocated for shared data network functionality using a CSMA/CD-style transmission protocol. Less commonly, data connections to the home are provided via satellite links where data are downloaded via the satellite link and uploads are handled through land lines, such as the telephone network. Another technique is to transmit data to the home via wireless, CAMA, for example, links.

Almost universally, the clients or network devices in the residences are personal computers. Typically, they execute application programs such as email clients and browsers that utilize the data network connectivity offered by one of the above techniques.

The trend, however, is towards a more ubiquitous computing model where the network devices in the home will be embedded systems designed for a particular function or purpose. This has already occurred to some degree. Today, for example, CATV network set-top boxes typically have limited data communication capabilities. Their main function is to handle channel access issues between residential users and a server on the cable TV network.

In the future, the functionality offered by these set-top boxes or other embedded platforms, such as a game system, will be expanded. For example, they may offer Internet browsing capabilities and e-commerce serving capabilities. Moreover, it is anticipated that common-household appliances will also have network functionality, in which they will be attached to the network to automate various tasks.

The data networks must evolve with deployment of these embedded systems. Where the personal computer can be updated with new network drivers as the network evolves, embedded client systems remain relatively static. Moreover, the process of installation in the residence must be made less complicated so that a network technician is not required every time a new embedded device is connected onto the network.

SUMMARY OF THE INVENTION

Previously, techniques have been developed that allow information to be downloaded to a television or set-top box. For example, under the standards established by the Advanced Television Enhancement Forum (ATVEF), HTML can be embedded in a video signal. Many previous systems have enabled information to be inserted into the vertical blanking interval of a video signal.

The problem is that these techniques are broadcast-based—with the same content being transmitted to all the devices that receive the video signal. They can not target users with specific attributes. In addition, these techniques require sophisticated video editing to insert information into the video signal.

The present disclosed system is directed toward a communication and management system that can dynamically targets network devices for content deployment, such as application programs, device drivers, configuration files, and registry subhives. Moreover, the present system targets users of network devices for promotions, such as advertisements offered by Internet, or other network, e-commerce sites. Promotions are generally icons or graphic images with links to host web servers overlaying a video display, but also includes audio and video clips or data streams.

Network devices and their users are targeted through user profiles. User profiles are created when network devices register with the system server and are continually updated with information provided by user activity and event logs that are periodically uploaded from each device.

The present invention implements a scalable messaging system for data transmission between the system server and among the network devices such that it is neutral as to the specific hardware platforms on which it is implemented.

One area of interest concerns the deployment (i.e. download and installation) of content to the network devices.

In general, according to one aspect, the present invention concerns a system for deploying content to targeted network devices over a data network. The system comprises a content store that stores the deployable content. A system manager then schedules the download of the content from the data store to targeted network devices.

Further, the system manager delivers criteria, set by the system administrator, for the activation of that content on the network devices. In this way, the present invention avoids the need to universally broadcast the content. It is downloaded, installed, and then activated based on specific criteria. As a result, a system constructed according to these principles allows for targeted deployment of the content. This content, then residing on the network device, is activated in response to established criteria.

In specific embodiments, the system manager selects targeted network devices among all of the network devices in response to profile information associated with those network devices. For example, the content can be targeted for deployment only to network devices in homes meeting predefined financial criteria.

Moreover, the deployment of content can be scheduled during off-peak periods of network activity. For example, during the early morning hours, data network activity is generally low and an optimal time for deployment. In other embodiments, the server system can actually monitor the network for periods of low network usage and schedule deployment during such periods.

In the preferred embodiment, a bulk data manager has access to the content store. It communicates with a bulk data transfer agent, executing on the network device, to move the content from the server system to the specific network device.

Once content is deployed, various types of activation criteria can be employed. Scheduled activation and event driven activation are two such methods of activating content at the network devices.

Scheduled activation includes activating content in response to a predetermined date and time as well as activation via start messages from the system server.

Event driven activation includes activating content based on the occurrence of events specified in an event map, such as channel events.

In the case of promotions, event driven activation also includes the activation of promotions triggered by HTML tags, or other triggers, embedded in a video signal.

In general, according to another aspect, the invention can also be characterized in the context of a method. The invention, in general, concerns a method for deploying content to network devices over a data network. This method comprises storing content on content store of a server system. The content is then scheduled for deployment from the system server to targeted network devices. Activation criteria is also downloaded to those targeted network devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5A is an example of the Document Type Definition used to define the document structure of the user activity and event logs written in XML (Extensible Markup Language) according to the invention.

FIG. 5B is an example of the representation of events stored in a user activity and event log written in XML according to the invention.

DETAILED DESCRIPTION OF THE INVENTION

The present invention is a communications and management system executing over a data network for targeting content, including promotions, to users of network devices whose attributes match the attributes of a group profile along with maintaining those network devices.

The system and methods of the present invention can be implemented over a variety of data network infrastructure including cable, satellite, Digital Subscriber Lines (DSL), and wireless networks.

Figure 1A:
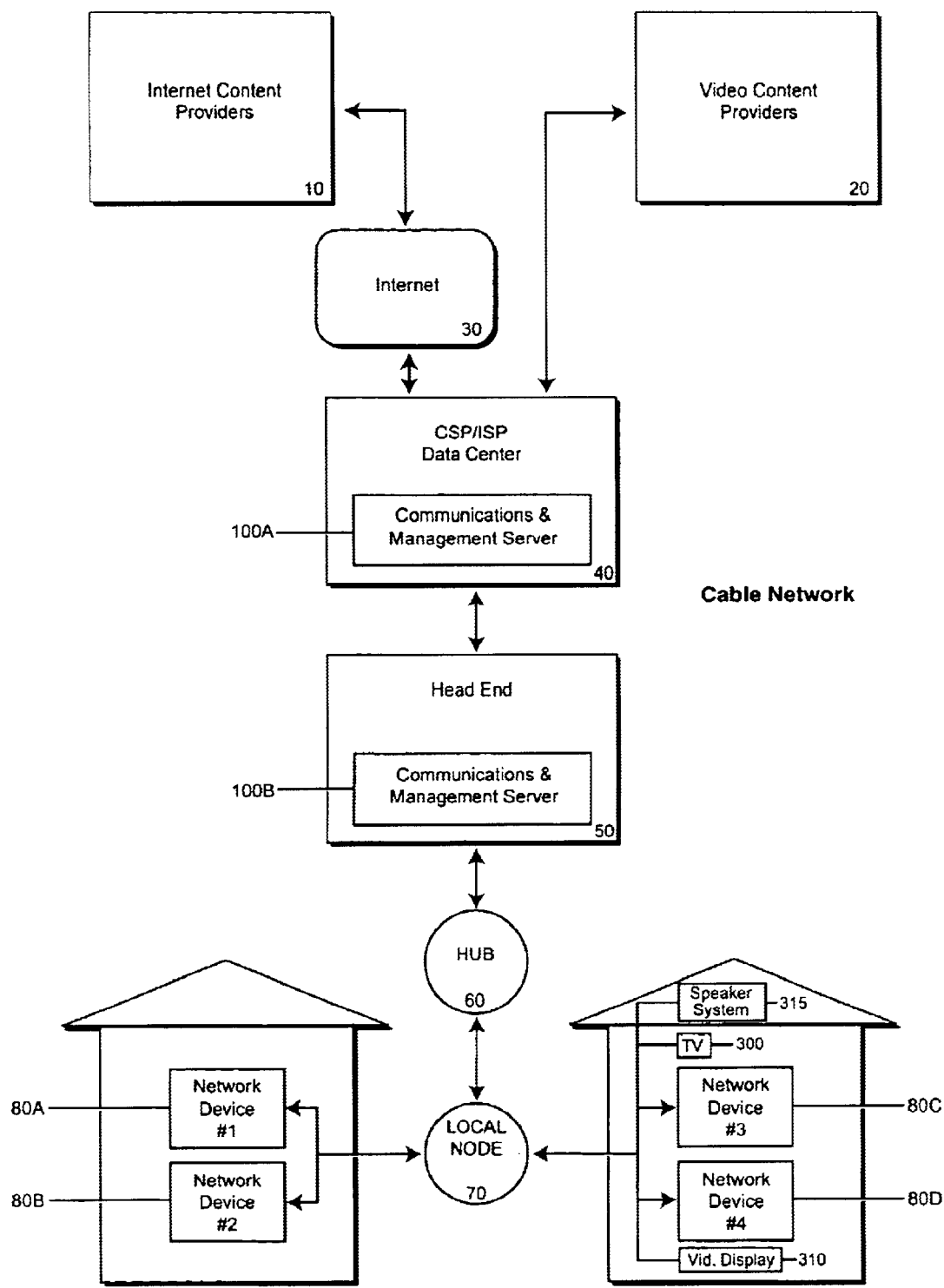
FIG. 1A is a schematic block diagram depicting a cable network infrastructure in which one embodiment of the present invention functions.

FIG. 1A shows one embodiment of the present invention in which the communications and management system is implemented over a cable network. In this environment, audio and video broadcasts are typically frequency multiplexed with data transmissions on the coaxial cables extending from the head end 50 to the exemplary network devices 80A, 80B, 80C, and 80D (collectively referred to as 80).

Video content providers 20 as well as Internet content providers 10 (i.e. host web servers) deliver their audio/video/data signals to a cable service provider/internet service provider (CSP/ISP) data center 40. The Internet content providers 10 deliver their data to the data center 40 via the Internet 30. Typically, video content providers 20 transmit their video signals to the data center 40 via some broadcast medium, such as conventional radio-frequency television broadcasting techniques, or via a digital satellite downlink.

The CSP/ISP data center 40 transmits the audio/video/data signals to multiple head ends 50 (only one being shown for simplicity of illustration). The connection between the data center 40 and the head end 50 is typically a hybrid CATV/data connection, which is supported by an optical fiber infrastructure. Part of this infrastructure carries the audio/video signals, which are directed from the data center 40 to the network devices 80. Part of this network also carries the bi-directional data communications associated with network control and internet service provisioning.

The head end 50 distributes the audio/video/data signals over a cable network of hubs 60 and local nodes 70 to a variety of network devices 80, such as set-top boxes, web phones, and cable modems. Some network devices 80D, such as a web phone, have a built-in video display 310 and speaker system 315. Other network devices 80C are peripherally attached to a video display device and speaker system such as a television 300.

In one embodiment of the present invention, the server system (100A and 100B, collectively referred to as 100), is located at the CSP/ISP data center 40 and the head end 50 of the cable network. Installation of the server system at the data center 40 and the head end 40 allows for scalability. The server system 100A at the data center 40 typically provides centralized management for configuring group profiles and content deployment options, while the server system 100B at the head end 50 preferably handles the registration, user profile updates, content deployment, and other services among the network devices 80.

There are alternative schemes for deploying the server system 100 within the cable network infrastructure depending on the capacity of the server system 100 and number of network devices 80. For example, the server system 100 is deployed at the hub 60 level when the population of devices is sufficiently dense to necessitate such distribution of the communication load.

Figure 1B:
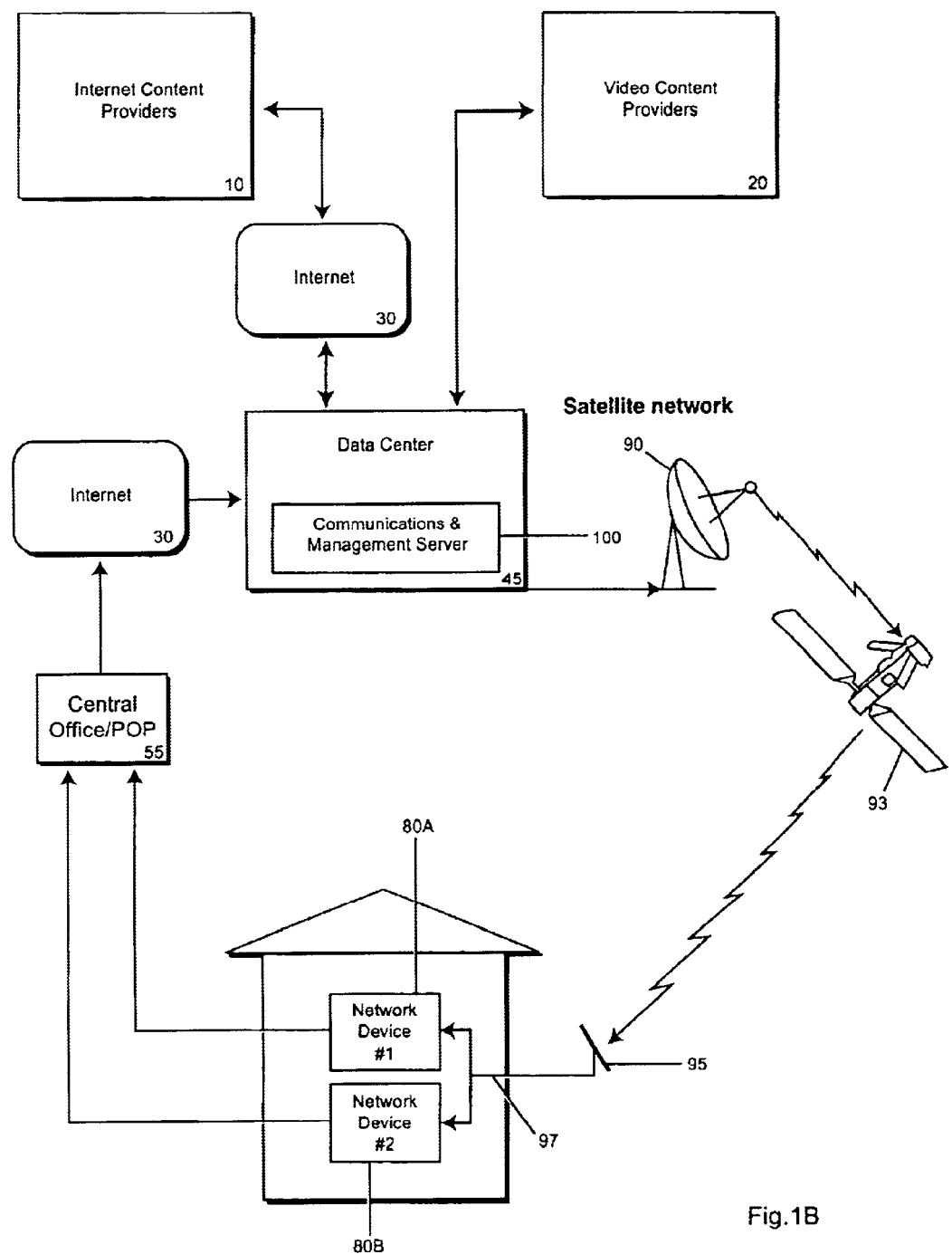
FIG. 1B is a schematic block diagram depicting a satellite network infrastructure in which another embodiment of the present invention functions.

FIG. 1B shows an embodiment of the present invention in which the communications and management system is implemented on a satellite network. In this environment, the server system 100 is located at data center 45.

The server system 100 transmits data to the network devices 80 via a satellite uplink device 90 to a satellite 93, which, in turn, transmits the data to a residential satellite downlink dish 95. The data are received by the network devices 80 connected to the downlink feed 97.

For the return, upload, path, the network devices 80 transmit data to the server system 100 through a built-in modem, other dial-up device, or a land line system such as ISDN or DSL. The modem connects to a central office or point-of-presence (POP) 55, which, in turn, transmits the return-path data over the Internet 30 to the data center 45.

Figure 1C:
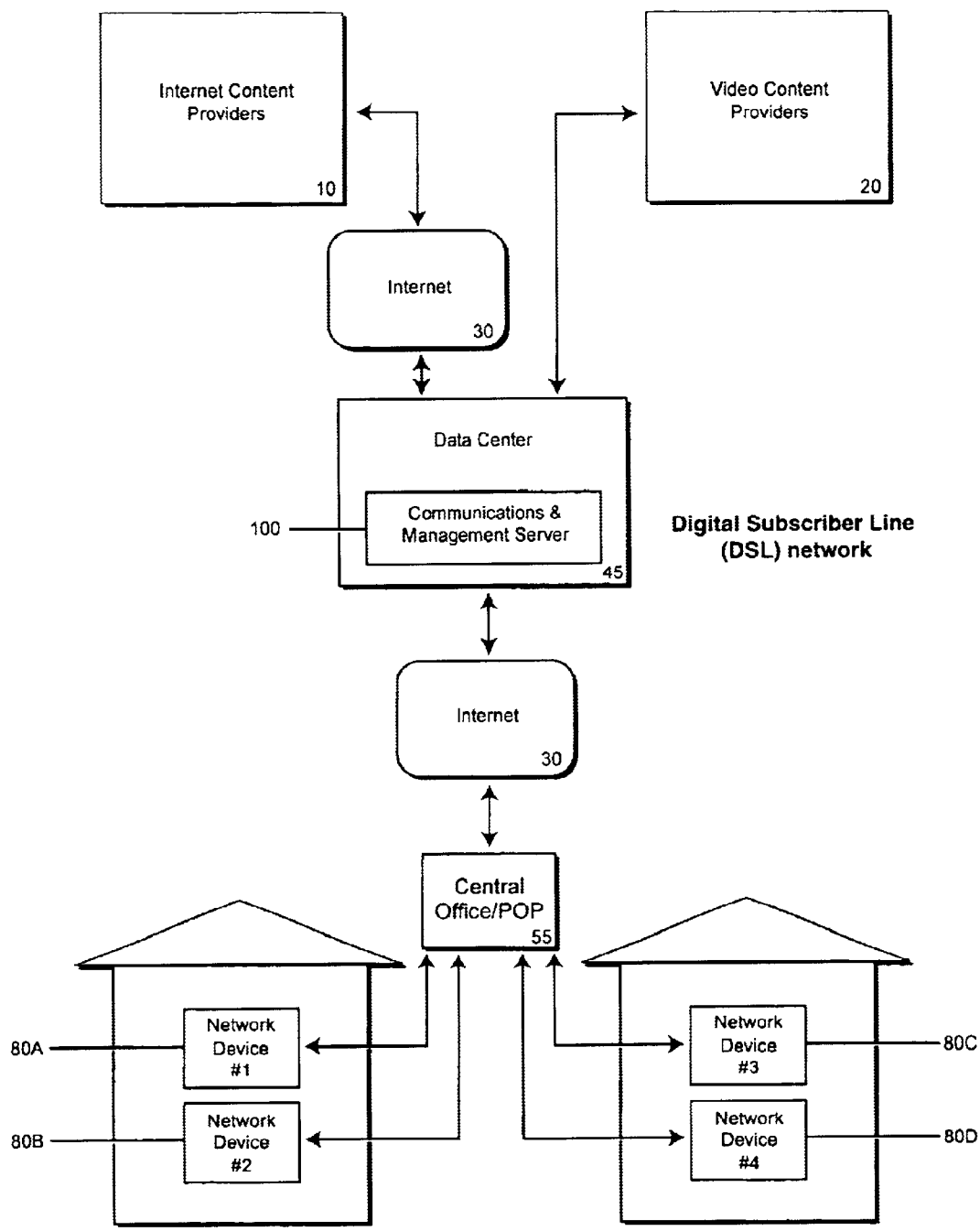
FIG. 1C is a schematic block diagram depicting a Digital Subscriber Line (DSL) network infrastructure in which still another embodiment of the present invention functions.

FIG. 1C shows an embodiment of the present invention in which the communications and management system is implemented on a Digital Subscriber Line (DSL) network. In this environment, the server system 100 is located at data center 45.

The server system 100 communicates bi-directionally with the network devices 80 via the Internet 30 or closed network connection, such as frame-relay, to a central office or point-of-presence (POP) 55. In one embodiment, the Internet connection between the server system 100 and the central office 55 is over a Virtual Private Network (VPN) providing a private, secure, encrypted connection tunnel.

The network devices 80 are connected to the Internet 30 by the central office 55 via Digital Subscriber Lines (DSL).

Figure 1D:
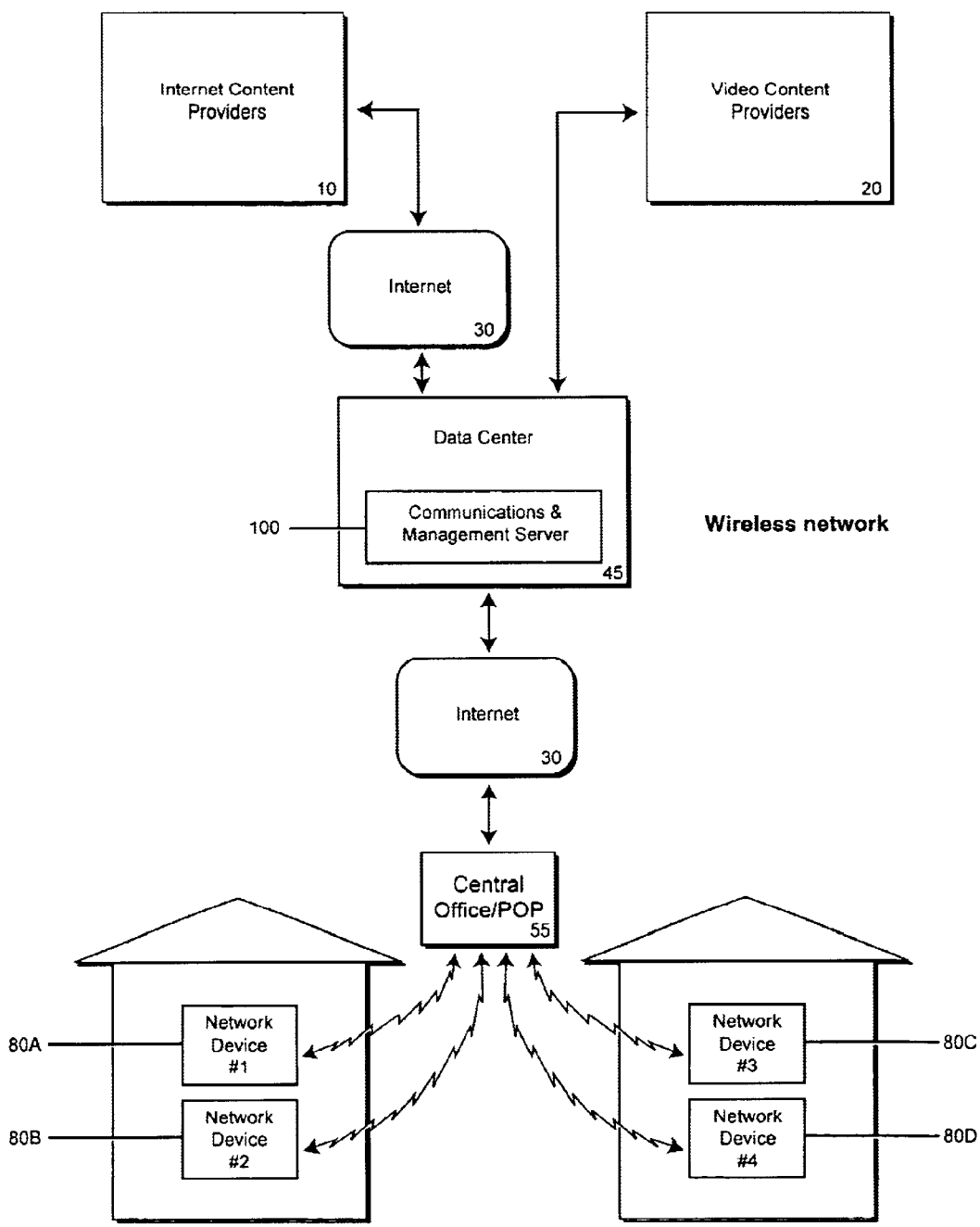
FIG. 1D is a schematic block diagram depicting a wireless network infrastructure in which another embodiment of the present invention functions.

FIG. 1D shows an embodiment of the present invention in which the communications and management system is implemented on a wireless network. This environment is similar to the DSL network with the exception that the network devices 80 are connected to the Internet 30 by the central office 55 via wireless, typically CDMA, connections.

Figure 2A:
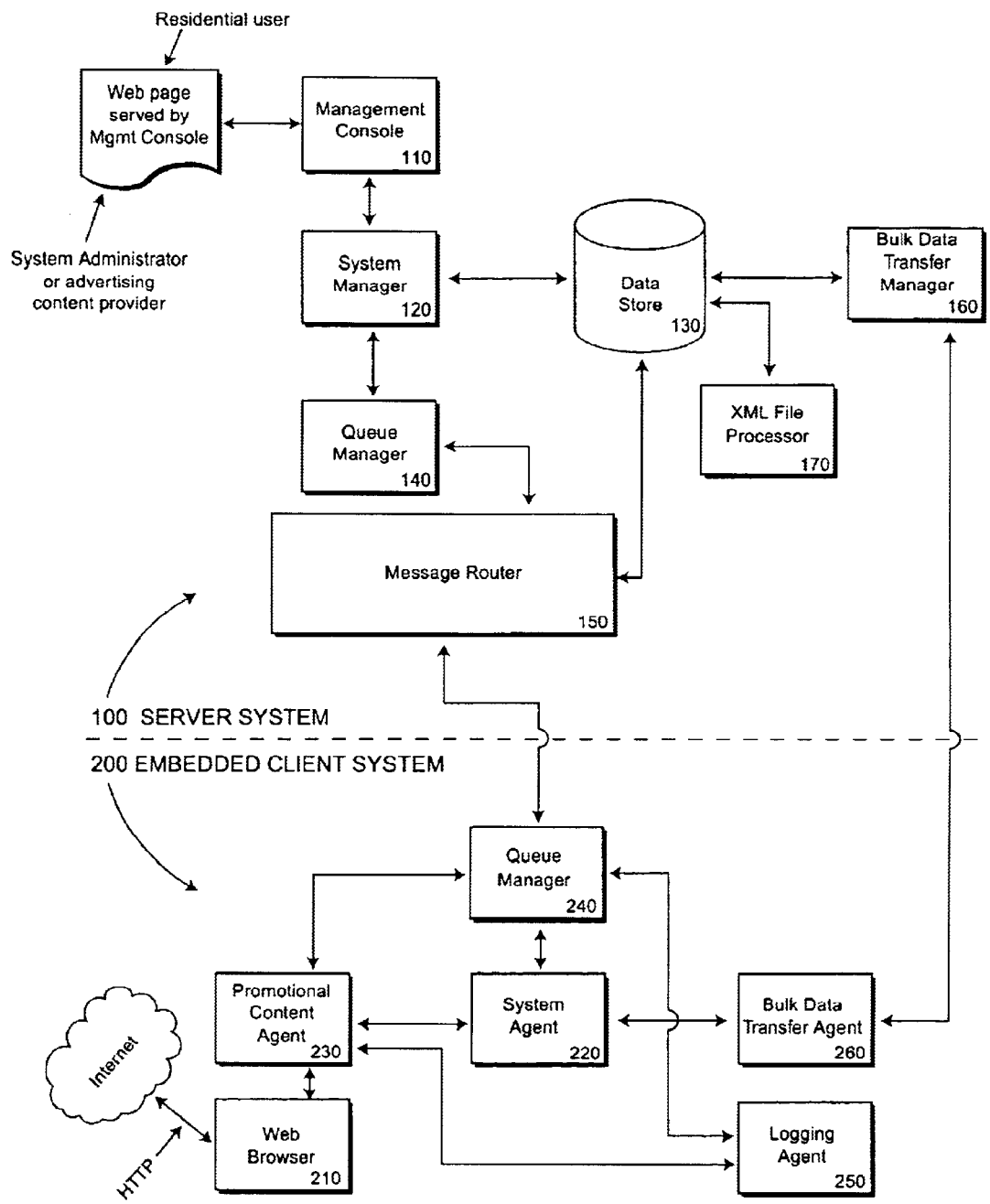
FIG. 2A is a block diagram depicting the interaction of the components of the server system and the embedded client system according to the invention.

FIG. 2A shows the organization of the server system 100 and the embedded client system 200 interacting to implement the communications and management system.

In brief overview, the server system 100 includes a management console 110, a system manager 120, a data store 130, a queue manager 140, a message router 150, a bulk data transfer manager 160, and an XML file processor 170. The embedded client system 200 executing in the network devices include a web browser 210, a system agent 220, a promotion notification agent 230, a queue manager 240, a logging agent, 250, and a bulk data transfer agent 260.

In more detail, the management console 100 is preferably implemented as a web server. In one embodiment of the present invention, the management console 100 is a Microsoft® Internet Information Server (IIS) implementing Active Server Pages (ASP).

The management console 100 provides, upon request by a system administrator, a web page interface for specifying the content to deploy, the attributes of a group profile that target a market segment of potential consumers, installation information, and criteria for activating the content or displaying the promotions at the network devices. Upon submitting the web page, the management console 100 communicates with the system manager 120, via an Application Programming Interface (API) to store the targeted group profile, activation criteria, and the content and promotions to the data store 130. In one embodiment the API is a Microsoft® COM interface.

Content includes, but is not limited to, applications, device drivers, data files, registry sub-hives, and promotions. Promotions are a special type of content that advertise goods and services. Promotions overlay the video display of a network device with a graphic, image, or animated icon that launches a web browser to a host web server in response to the user clicking or selecting it. Promotions also include audio and video clips or data streams. One or more promotions can be displayed on the video display at one time.

The management console 110 also provides a web page interface to users upon request during the initial registration of their network devices. Users will register through the web page interface, providing data about themselves. Upon submitting the web page, the management console 110 communicates with the system manager 120, via the COM interface, to store the user data as attributes of a user profile. The attributes of the user profile are associated with the attributes of the group profile in order to target potential consumers who would be interested in the content or promotions.

The system manager 120 is an application-level process that manages the reading and writing of data to the data store 130. The system manager 120, through its COM interface, allows the management console 110 to store user profiles, content including promotions along with associated group profiles, installation information, and activation criteria. In addition, the system manager 120 updates the user and group profiles whenever new attributes are received.

The system manager 120 also interacts with the system agent 220 of the targeted network devices by sending and receiving messages through a messaging protocol. The interaction of the system manager 120 and the system agent 220 implement the scheduling of content deployment as well as installation and activation of the content. In one embodiment, the system manager is implemented as a Microsoft® COM object.

The queue manager 140 is an application-level process that communicates with the message router 150 on behalf of other processes, such as the system manager 120, in order to send and receive messages among the embedded client systems 200. In one embodiment, the queue manager 140 is implemented as a C++ object. The queue manager 140 also manages incoming and outgoing queues on behalf of the other processes in the system server 100.

The queue manager 140 handles two types of queues, persistent queues and volatile queues. Messages, whose message type indicates persistent storage, are stored such that the message will not be lost during power outages and lost network connections. A persistent queue is stored in persistent flash memory or in a location on the hard disk of the network device. Other messages, not intended for persistent storage, are stored to volatile queues and might be lost during power outage and lost network connections.

The data store 130 is a database that stores the attributes of the user profiles, group profiles, content and promotions along with the activation criteria. In addition, the data store 130 stores messages intended for network devices that are unavailable during the initial delivery attempt. The data store provides persistence to the data stored such that the content, profiles, and messages will not be lost during a power outage. In one embodiment, the data store 130 is a Microsoft® SQL version 7 database. Since the data store stores content, it is also known as a content store.

The bulk data transfer manager 160 is an application-level process that is responsible for the transfer of bulk data to targeted network devices. Bulk data include large stream-oriented data, such as a promotions, files, or registry sub-key hives. The bulk data transfer manager 160 does not transmit data over the messaging protocol. Instead, it transmits serialized data over a network transport protocol, such as TCP/IP. The bulk data transfer manager 160 has access to the data store 130 for transmitting content and promotions.

The XML File Processor 170 is an application-level process that is responsible for parsing out the user attributes from the raw user activity and event logs and updating the appropriate user profiles. In one embodiment, the logs are stored as XML files in the data store 130.

In more detail of the embedded client system 200, the system agent 220 is an application-level process that communicates with the system manager 120 handling various request messages and registration. In handling the various request messages, the system agent communicates with the other embedded client system components in order to effect a proper response or behavior. In one embodiment, the system agent 220 is implemented as a C++ object.

As in the system server, the queue manager 240 is an application-level process that communicates with the message router 150 on behalf of other processes, such as the system agent 220, in order to send and receive messages to the system server 100 and other network devices. In one embodiment, the queue manager 240 is implemented as a C++ object. The queue manager 240 also manages incoming and outgoing queues on behalf of the other processes in the embedded client system 200.

The queue manager 240 handles two types of queues, persistent queues and volatile queues. Messages, whose message type indicates persistent storage, are stored such that the message will not be lost during power outages and lost network connections. A persistent queue is stored in persistent flash memory or in a location on the hard disk of the network device. Other messages, not intended for persistent storage, are stored to volatile queues and might be lost during power outage and lost network connections.

The bulk data transfer agent 260 is an application-level process that handles requests from the system agent 220 to either download content and promotions or upload user activity and event logs. The bulk data transfer agent 260 communicates with the bulk data transfer manager 160 of the system server 100 over a network transport protocol, such as TCP/IP. The bulk data transfer agent 260 notifies the system agent 220 upon completion or failure of the data transfer. In one embodiment, the system agent 220 is implemented as a C++ object.

The promotion notification agent 230 is an application-level process that triggers and handles the display of promotions. The promotion notification agent 230 overlays the promotion or promotions onto the video signal that gets displayed on a monitor connected to a set-top box or to a web phone display. The promotion notification agent 230 coordinates the activation of promotions. A promotion notification agent 230 will display the promotion in response to an event, invocation by the system manager 120, or scheduling information provided with the promotion itself.

The web browser 210 is an application-level process that displays web pages from web host servers such as the management console 110 of the system server 100 enabling registration of user attributes.

The logging agent 250 is an application-level component that monitors and logs a variety of user activities and events. In one embodiment, the logging agent 250 stores the log files in XML format. User activities and events that are tracked by the logging agent 250 are channel events, promotion events, power events, peripheral events, and application events.

Channel events occur whenever the network device stays tuned to a channel for a configurable amount of time. Promotion events occur in response to consumer actions taken with respect to promotions displayed on the video display. For example, a promotion event is recorded when the consumer clicks or selects the promotion icon to navigate to the web server hosting the promotion.

The interaction of the server system 100 and the embedded client system 200 provides a system for targeting and scheduling deployment of promotional content to consumers of a targeted market segment, for managing the activation of the promotional content, and for tracking consumer response to the promotion.

Application-level processes, such as the system manager 120 of the server system and the system agent 220 of the network device, communicate over the data network through messages.

Messages transfer requests for action, responses to requests, and small data transfers. Messages are transported in the payload of a network transport protocol, such as TCP/IP. Messages are sent to destinations using a globally unique identifier, GUID, in order to identify the destination network device or application. This messaging protocol allows application-level processes to transmit data without knowing about the network transport interface, the device's network address, or whether the device is active on the data network.

The interaction of the message router 150 with the queue managers of the source and destination processes implements the messaging protocol. Any queue manager whether it is executing on the system server 100 or the embedded client system 200 communicates with the message router 150 in the same manner.

Figure 2B:
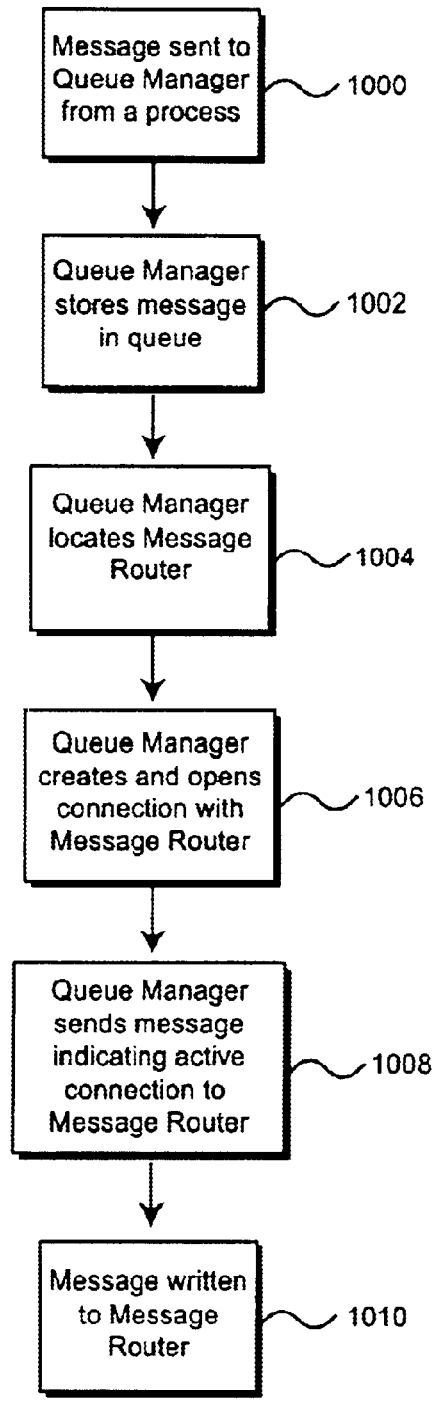
FIG. 2B is a process diagram illustrating the interaction between a queue manager and the message router according to the invention.

FIG. 2B illustrates the interaction between a queue manager and the message router 150 according to the invention. For example, when the system manager 120 needs to transmit a message to a system agent 220, the system manager 120, in step 1000, sends the message to the queue manager 140 indicating the message type, a globally unique identifier (i.e., GUID) of the destination device, and the message data. The details on how a network device obtains a GUID is described later with reference to FIG. 3.

In step 1002, the queue manager 140 stores the message in a queue for the system manager 120 and then attempts to establish a connection with the message router 150.

In brief overview, there are three steps in order for the queue manager 140 to establish a connection to the message router 150. In step 1004, the queue manager 140 determines the IP address of the message router 150. In step 1006, the queue manager 140 creates and opens a socket pair connection to the message router 150 for transmitting serialized data. In step 1008, the queue manager 140 sends a message to the message router 150 indicating that the queue manager 140 is alive and connected and ready to transmit serialized data.

In more detail of step 1004, the queue manager 140 has one of its properties being the location or name of the message router 150. Using DNS, or IP host name services, the queue manager 140 determines the IP address of the message router 150. If the queue manager 140 cannot resolve the IP address of the message router 150, the queue manager 140 resorts to a broadcasting scheme. The queue manager 140 broadcasts a locator message on its subnet attempting to locate the message router 150. If there is a message router 150 on that subnet, the message router 150 responds back with its IP address. This address is cached by the queue manager 140 for future connections.

In step 1006, the queue manager 140, knowing the IP address of the message router 150, creates and opens a socket pair on predetermined, known ports for transmitting serialized data.

In step 1008, once the socket pair is opened, the queue manager 140 sends a message notifying the message router 150 that the queue manager 140 is alive and connected and has socket pairs on which to read or write serialized data.

Figure 2C:
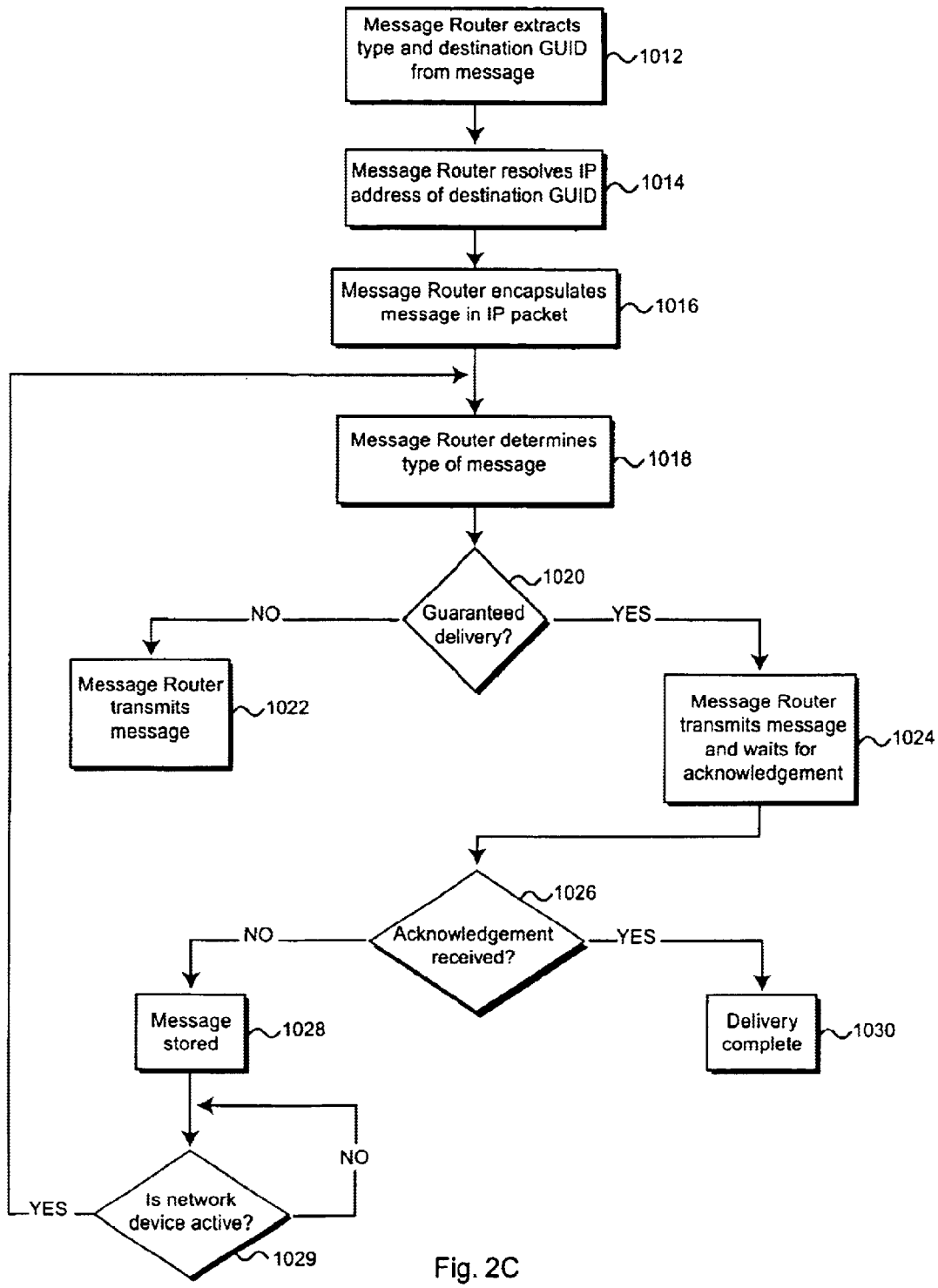
FIG. 2C is a process diagram illustrating a process for delivering a message via the message router according to the invention.

In step 1010, the queue manager 140 writes the message for delivery to the message router 150 through the established TCP/IP socket connection FIG. 2C illustrates the process of delivering the message once received by the message router 150.

Upon completion of the writing of the message, the message router 150 extracts the message type and the destination GUID from the message in step 1012.

In step 1014, the message router 150 resolves the destination GUID by looking-up the IP address associated with the GUID in the data store 130.

In step 1016, the message is encapsulated in an IP packet, with the appropriate destination IP address. In one embodiment, the IP address of the network device becomes known to the system server 100 during initial registration of the network device and is stored as an attribute of the user profile.

In step 1018, the message router 150 determines the type of the message. The message type indicates the quality of service that the message router 150 provides for delivery of the message.

If the message type is a standard datagram, the message router 150 simply transmits the message in step 1022. The message router 150 will not keep track of whether the message was actually received.

If the message type indicates guaranteed delivery, the message router 150 will transmit the message and wait for an acknowledgment from the destination device in step 1024.

If no acknowledgment is received after several attempts, the destination is deemed unavailable and the message is stored in the data store 130 for later retransmission when the destination is active on the data network in step 1028. Specifically, in step 1029, the message router waits for the network device 80 to become active in order to deliver the message. In one embodiment, the message router 150 is notified that the network device is active by receiving a message from the network device 80 indicating its active status. In an alternative embodiment, the message router is notified of the active status of a previously unavailable network device by the system manager 120 which monitors the status of the network devices 80. When the network device becomes active, the message router proceeds back to step 1018 to begin the process of delivery again.

If the acknowledgment is received, then, in step 1030, the delivery is complete and the message is removed from the data store 130 if the network device was previously unavailable.

The interaction of the message router 150 and the queue manager 140 for delivering messages occurs whenever a message is sent or received using the messaging protocol.

In order for the server system 100 to target content and promotions to a particular market segment, the server system 100 references its stored user profiles, each user profile being a collection of user and device attributes associated with a network device. All network devices whose user profiles match the attributes of the group profile, targeted by a system administrator, are scheduled for content deployment.

However, when a network device is connected to the network infrastructure for the first time, the system server does not have a user profile for the network device. The present invention provides an automated system and method for initially registering and generating a user profile for an network device.

Figure 3:
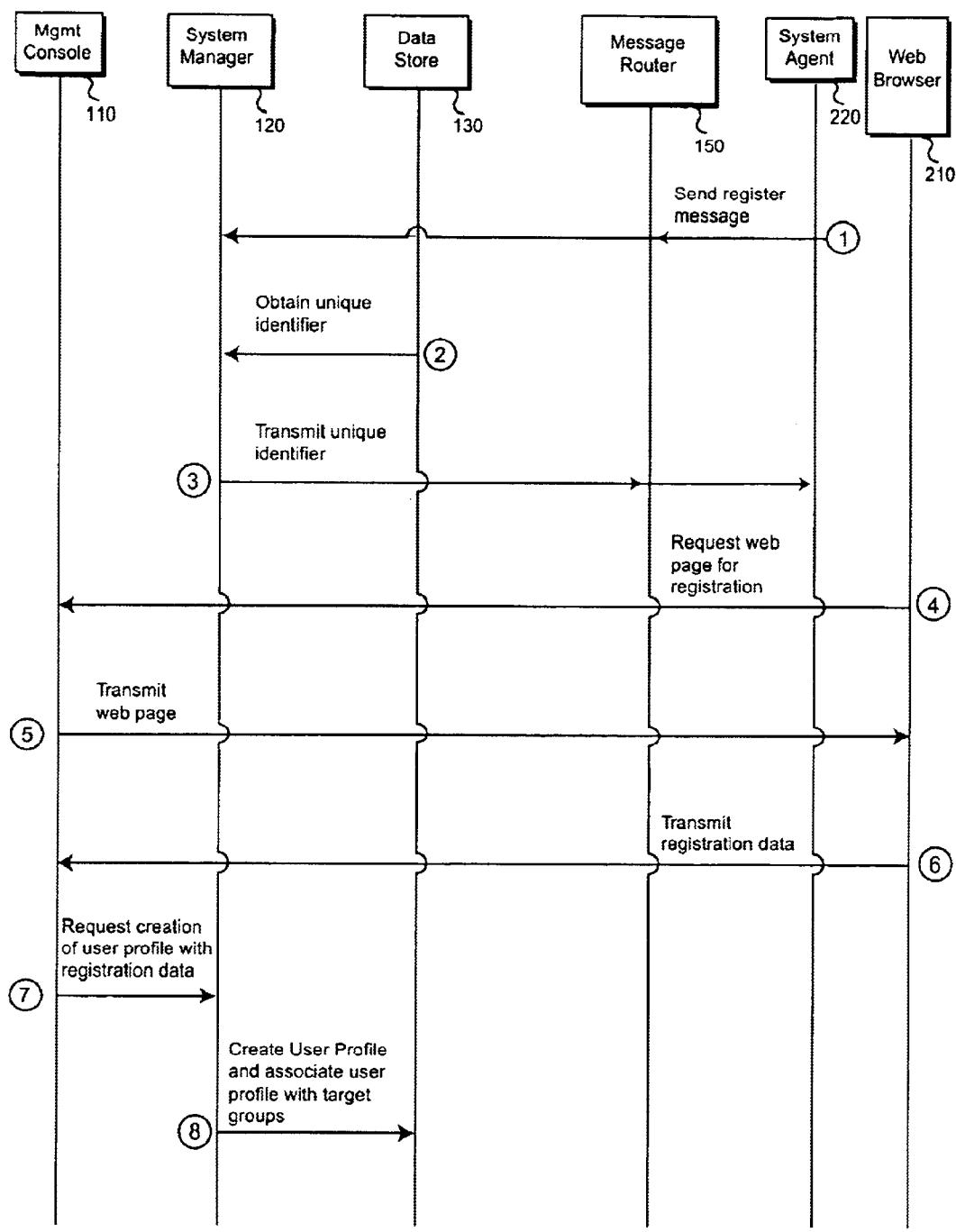
FIG. 3 is a state line diagram illustrating a process for automatically registering a device and generating user profiles for targeting content according to the invention.

FIG. 3 is a state line diagram showing the interaction of the server system 100 and the embedded client system 200 for generating an initial user profile for a network device.

In step 1, the system agent 220 of the network device generates and transmits a registration request message containing a number of device attributes to the system manager 120.

The device attributes describes the network device and is configured during the manufacturing process of the device itself. For example, the network device may be configured with a model number attribute for a particular group of network devices, such as intelligent set-top boxes, version 1.0.

In step 2, the system manager 120 receives the registration request message and, in response, retrieves a globally unique identifier, GUID, from an available pool of GUIDs stored in the data store 130.

In step 3, the system manager 120 generates and transmits a registration response message containing the assigned GUID to the system agent 220 of the registering device.

The assigned GUID is used by the network device to identify itself in messages transmitted to the system server 100 and to other network devices. The assigned GUID is also used by the system server 100 to associate the network device with a user profile within the data store 130.

In step 4, the system agent 220 launches a web browser 210. The web browser 210 transmits an HTTP request to the URL (Uniform Resource Locator) of the management console 110 for a registration web page. The assigned GUID is included in the URL string in order to identify the registering network device.

In step 5, the management console 110 receives the HTTP request. In response, the management console 110 makes a call via the COM interface of the system manager 120 to retrieve the device and user attributes, if any, associated with the GUID of the registering network device. The management console 110 generates the registration web page customized for the registering network device. The web page is transmitted via HTTP to the web browser 210.

In step 6, the web browser 210 displays the registration web page wherein the user submits information which will be used to generate a user profile of user attributes associated with the network device. Such information includes, but is not limited to, name and address information, channels frequently watched, requests for installation of optional value-add services and applications, and various demographic and personal information.

Upon submitting the registration data, the web browser 210 transmits the user attributes, represented as HTML data via HTTP, to the management console 110.

In step 7, the management console 110 interprets the HTML data stream and makes calls via the COM interface of the system manager 120 to update the user profiles in the data store 130 with the provided user attributes.

In step 0.8, the system manager 120 updates the user profile of the registering network device with the user attributes on the data store 130. After updating the user profile, the system manager 120 associates the user profile with group profiles whose attributes match user attributes of the user profile.

For example, the user profile will be added to the group profile for network devices with the same model number attribute. The user profile is added to any number of group profiles that target particular attributes of the registered user or network device. These group profiles are used by the system manager 120 for targeting consumers of particular market segments for various e-commerce promotions or application services.

Once the network device is registered and is associated with a user profile, the device is capable of being targeted for deployment of content or promotions.

Figure 4A:
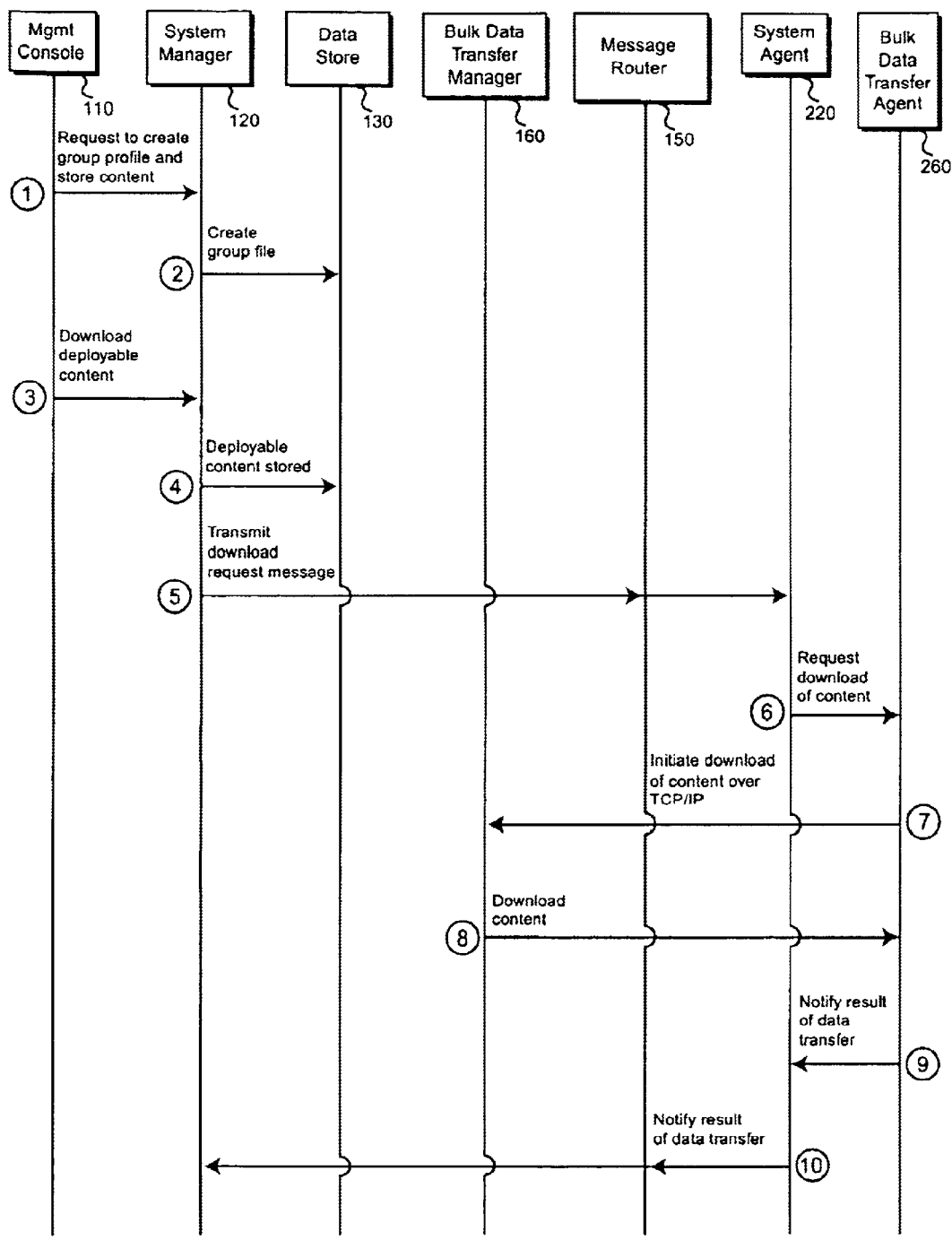
FIG. 4A is a state line diagram illustrating a process for targeting consumers with content (e.g., graphical promotion) and deploying the content to a targeted device according to the invention.

FIG. 4A is a state line diagram showing the interaction of the server system and the embedded client system for deployment of content and promotions to a network device. Deployment includes, but is not limited to, downloading and installing.

Before content can be deployed to a targeted device, the content must be stored in the data store 130 along with a group profile and an activation schedule. The group profile indicates the attributes of network devices to target. The activation schedule indicates when to activate the content or promotions. Activation can be event driven, scheduled from the system server 100, or initiated by the system manager 120.

In step 1, a system administrator with access to the management console 110 populates a server-based web page indicating the content to deploy as well as the criteria with which to define the group profile. Additionally, the system administrator indicates when to activate the content. Upon submitting the data, the management console 110 makes a call to the COM interface of the system manager 120 to generate a group profile in the data store 130 with user profiles whose attributes match the criteria defined by the system administrator.

In step 2, the system manager 120 updates the data store 130 creating the group profile and populating the group profile with user profiles with matching attributes.

In step 3, the management console 110 make a call through the COM interface of the system manager 120 to download the content or promotion to the data store 130.

In step 4, the system manager 120 writes the content to the data store 130.

The system manager 120 is configured to schedule deployment of content during off-peak hours when bandwidth utilization is typically at a minimum. For example, during the hours of 3:00 AM and 5:00 AM, more bandwidth is available for efficient deployment of content and promotions. Alternatively, the system manager 120 monitors network utilization and is configured to schedule deployment of content when the detected bandwidth utilization falls below a predetermined level.

In step 5, the system manager 120 sends a download and install request message to each of the system agents 220 of the network devices whose user attributes match the attributes of the group profile. The download and install message informs the system agent 220 to download install the content or promotion referenced by a GUID.

Alternatively, the system manager 120 sends a download, install, and start request message which indicates, in addition, when or under what event conditions the content should be activated (i.e. promotion displayed or an application launched).

In step 6, the system agent 220 makes a C++ object method call to the bulk data transfer agent 260 to download the content having the provided GUID.

In step 7, the bulk data transfer agent 260 sets up a TCP/IP socket connection to the bulk data transfer manager 160 of the server system to initiate the delivery of the application.

In step 8, the bulk data transfer manager 160 delivers the requested content to the bulk data transfer agent 260 through the TCP/IP socket connection. In cases where the connection is broken, the bulk data transfer agent 260 and the bulk data transfer manager 160 can detect that a connection was broken and will continue the download the content from the point in the transfer where the break occurred.

In step 9, the bulk data transfer agent 260 notifies the system agent 220 the result of the data transfer via an C++ object method call.

In step 10, the system agent 220 sends a message to the system manager 120 indicating the result of the data transfer.

After the content is installed on the targeted network device, the present invention provides a system and method for activating that content. Activation allows the user to interact with the installed content, such as playing a game or initiating an e-commerce transaction.

There are two types of activation that the present invention implements scheduled activation and event driven activation. Scheduled activation allows the system administrator to specify when to activate the content, whereas event driven activation allows the system administrator to specify an event which triggers the activation of the content.

Scheduled activation is implemented in two ways, predetermined scheduling and activation by the system server.

Figure 4B:
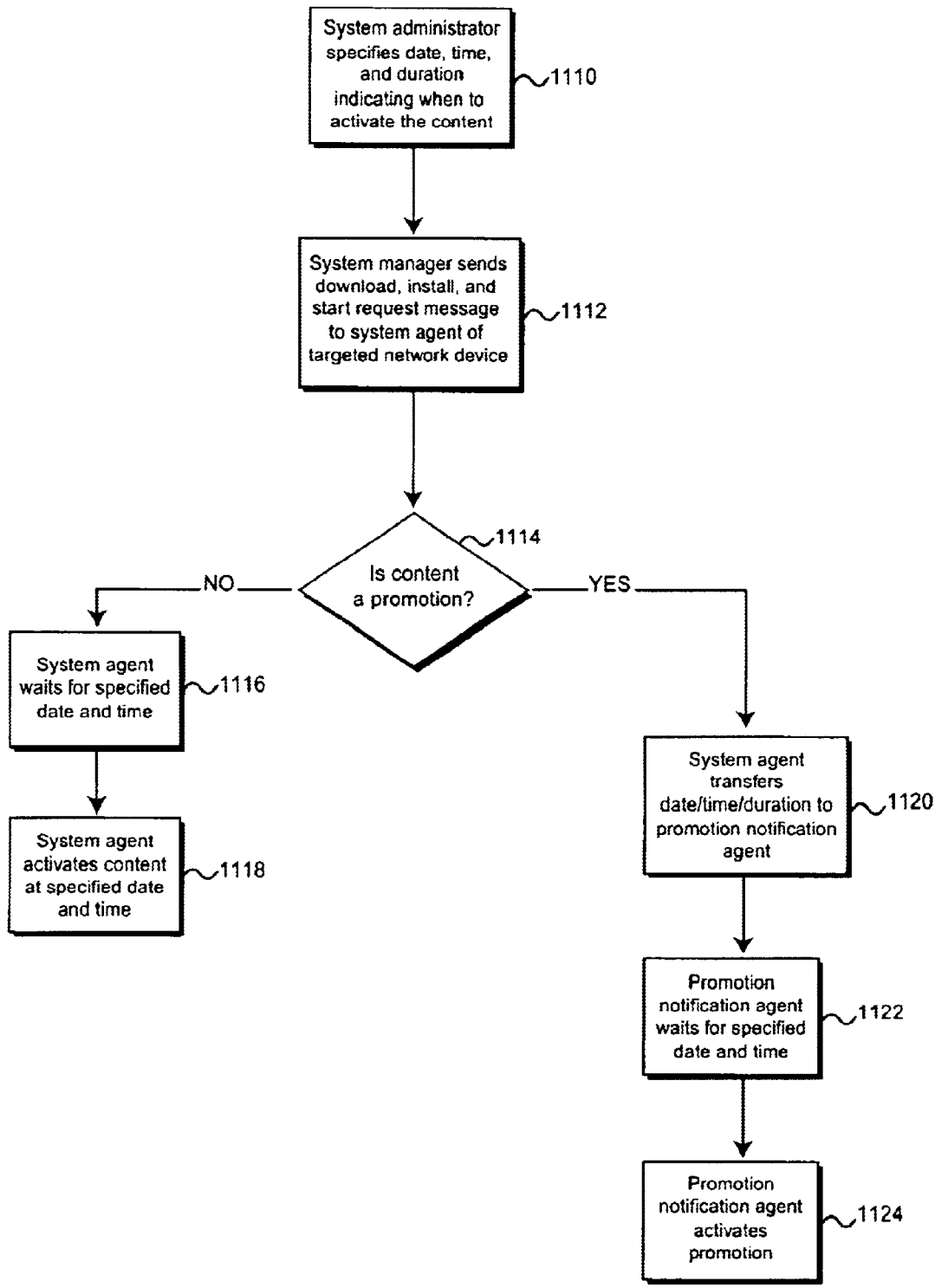
FIG. 4B is a process diagram illustrating a process for scheduling activation of content with a predetermined date and time according to the invention.

FIG. 4B illustrates the steps associated with content activation via predetermined scheduling. Predetermined scheduling based upon date and time provides the most autonomy to the network device. After the content is deployed, the network device simply waits for the specified date and time to arrive, at which time it displays the content.

In step 1110, when the group profiles are configured and the content is downloaded to the data store 130, the system administrator also specifies the date and time to activate the content. Where the content is a promotion, a duration period is specified along with the activation date and time.

In step 1112, the system manager 120 sends the download, install, and start request message to the system agent 220 of a targeted network device. In addition to requesting the system agent 220 to install content, the message indicates the date and time to activate the installed content.

If the content is a not a promotion, the system agent 220 waits for the specified activation date and time in step 1116.

In step 1118, the content is activated by the system agent 220 at the specified date and time.

If the content is a promotion, the system agent 220 transfers the predetermined date, time, and duration to the promotion notification agent 230 in step 1120.

In step 1122, the promotion notification agent 230 waits for the specified activation date and time.

In step 1124, the promotion is activated by the promotion notification agent 230 at the specified activation date and time.

If the promotion is a icon or graphic linked to a URL of a host web server, the promotion notification agent 230 overlays the promotion on a portion of the video display built-in or attached to the network device. If the promotion is audio clip or data stream, the audio is played through a speaker built-in or attached to the network device. If the promotion is a video clip or data stream, the video overlays a portion of the video display built-in or attached to the network device.

Figure 4C:
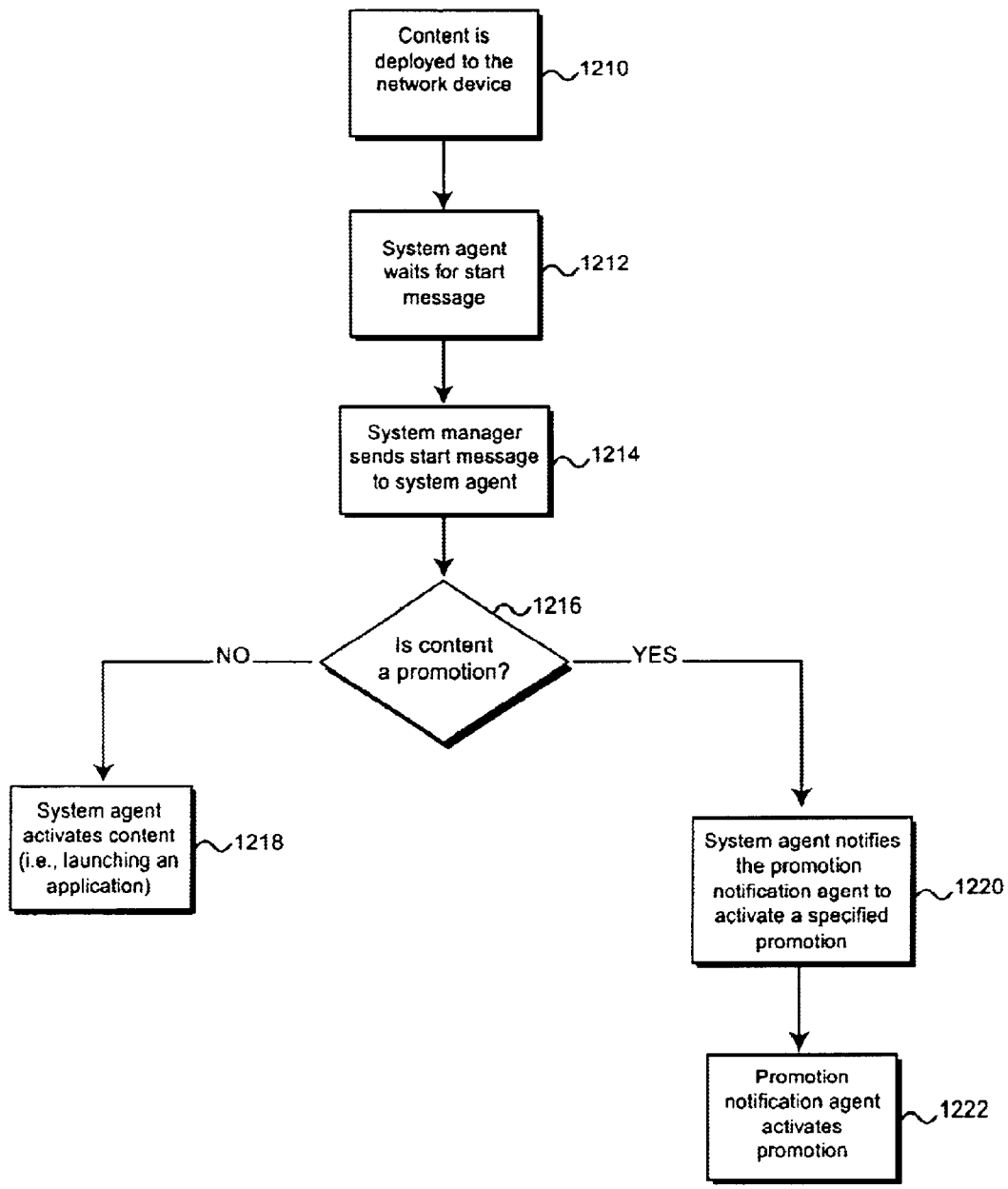
FIG. 4C is a process diagram illustrating a process for scheduling activation of content by server activation according to the invention.

FIG. 4C illustrates the steps associated with server activation of content. Server activation of content allows control to reside at the server system 100, therefore, maximizing the control by the institution operating the server system 100.

As described previously, the content is installed on the network device in step 1210 with no activation information.

In step 1212, the system agent 220 waits for a start message from the system server 100.

In step 1214, upon request of the system administrator, the system manager 120 sends a start message to the system agent 220 specifying the installed content to activate.

If the installed content is not a promotion, the system agent activates the content in response to receiving the message in step 1218. This may include, but not limited to, launching an application installed within the network device.

If the installed content is a promotion, the system agent 220 notifies the promotion notification agent 230 via a C++ object method call to activate the specified promotion in step 1220.

In step 1222, the promotion is activated by the promotion notification agent 230.

Event driven activation is particularly suited for coordinating the activation of content with a particular event or a particular moment in a corresponding analog and/or digital video stream.

Event activation has advantages associated with high scalability. The content can be loaded in the days or weeks preceding the general time period when it is to be displayed.

In one embodiment, events that trigger content activation are channel events, power events, and peripheral events. A power event is an event relating to the power supply, such as the network device being powered on or off. A peripheral event is an event relating to peripheral devices being connected or disconnected from the network device, such as a joy stick or other gaming console. A channel event is an event relating to the channel being watched by the user.

Figure 4D:
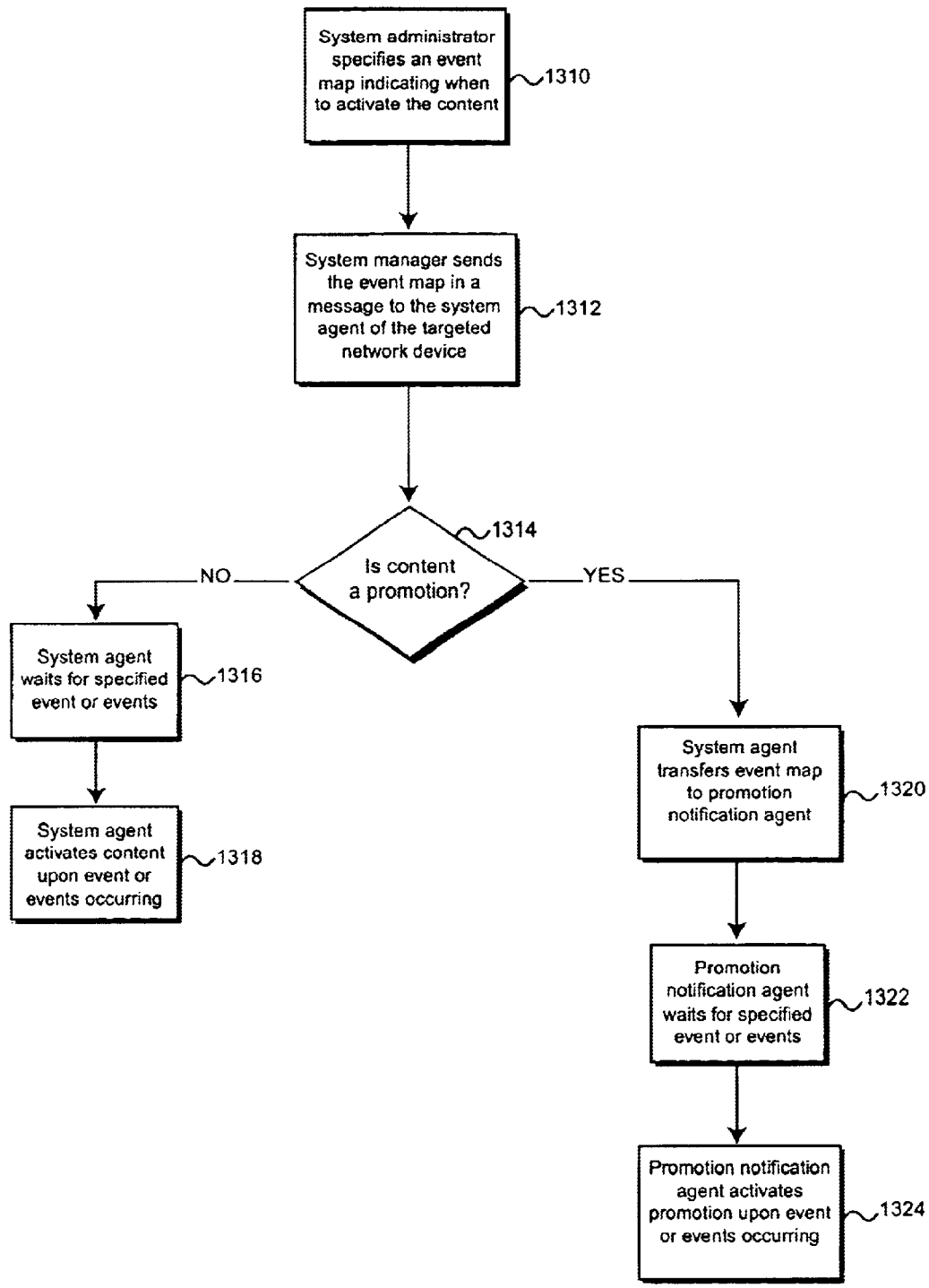
FIG. 4D is a process diagram illustrating a process for event driven activation of content according to the invention.

FIG. 4D illustrates the steps associated with event driven activation according to the invention.

In step 1310, when the group profiles are configured and the content is downloaded to the data store 130, the system administrator also specifies an event map. An event map associates events to content indicating when to activate the content. Where the content is a promotion, a duration period is specified as well.

In step 1312, the system manager 120 sends the event map in a message, such as a download, install, and start message, to the system agent 220 of a targeted network device.

If the content is not a promotion, the system agent 220 waits for the specified event or events that trigger the activation of the content in step 1316.

In step 1318, the system agent 220 activates the content when the specified event or events occur.

Conversely, if the content is a promotion, the system agent 220 transfers the event map to the promotion notification agent 230 in step 1320.

In step 1322, the promotion notification agent 230 waits for the specified event or events to occur.

In step 1324, the promotion notification agent 230 activates the promotions associated with the event or events that occurred.

An example of event driven activation is where the event map provides for the activation of promotions involving sporting goods when the potential consumer has been watching a particular sports channel for a period of time. The watching of the sports channel for a period of time triggers a channel event. The channel event triggers the activation of the promotion or promotions.

The present invention provides an additional implementation of event driven activation involving technology from ATVEF (Advanced Television Enhancement Forum). ATVEF provides a standard for embedding HTML tags within a video signal.

The promotion content agent 230 monitors the video signal for the embedded triggers, such as the HTML tag. The capture of this embedded trigger causes the activation of one or more promotions in real-time coinciding with the video signal.

Such a system has advantages in that very little video signal editing is required. Only a small trigger has to be embedded in the video signal, requiring little analog video editing capabilities at the data center.

The content, is simultaneously activated on all of the network devices allowing high levels of synchronization to the video signal. For example, the promotion can be synchronized to occur during a television commercial.

The provider of the commercial simply embeds an initialization or start HTML tag within its video signal. In response to the promotion notification agent 230 capturing the HTML tag, the promotion notification agent 230 activates the appropriate promotion or promotions specified in the event map for that HTML tag.

Figure 4E:
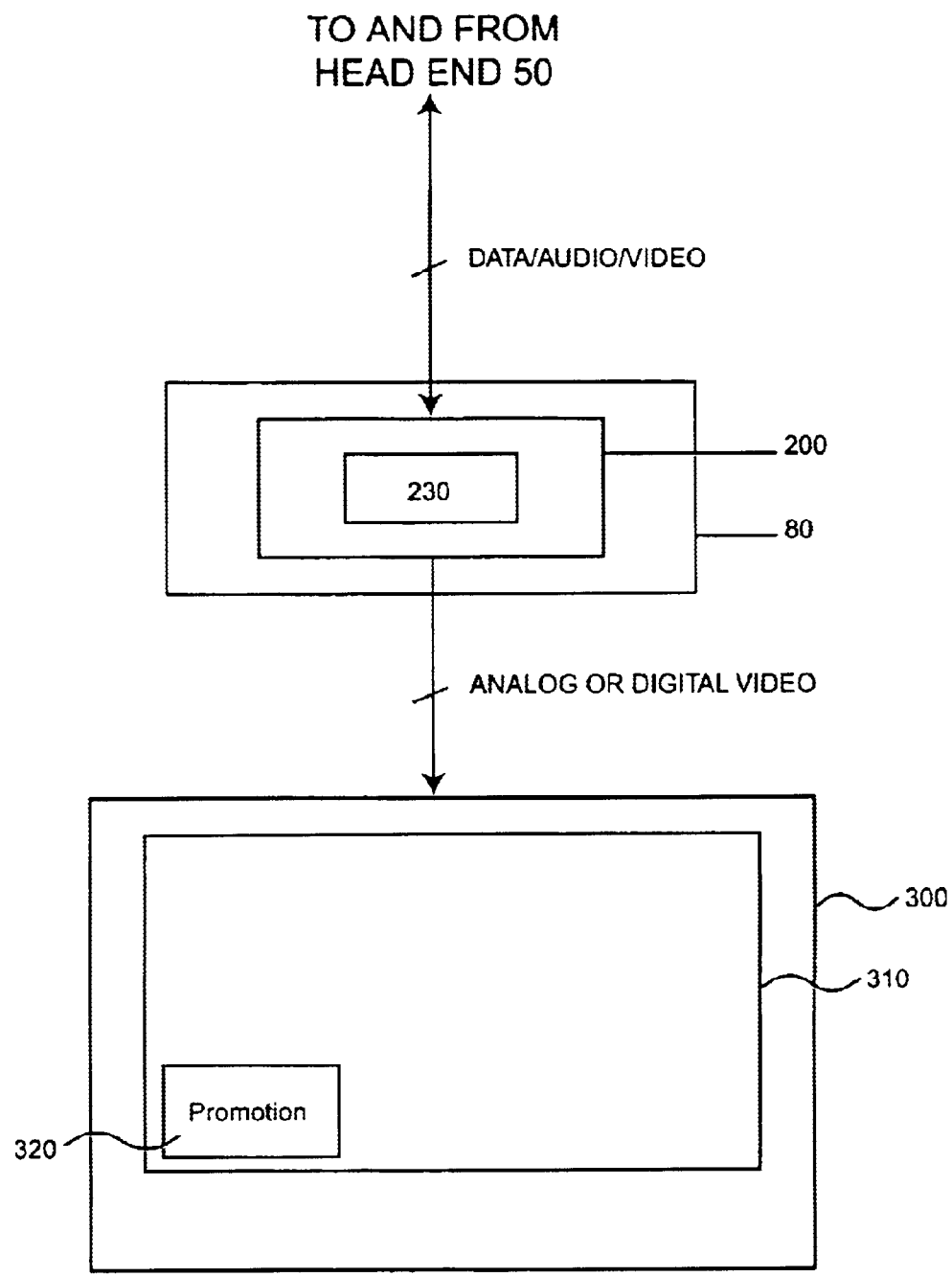
FIG. 4E is a block diagram depicting event driven activation involving trigger signals in the video stream according to the invention.

FIG. 4E shows one embodiment of this system on a conventional set-top box 80 for an analog or an analog/digital video display device such as a television 300. Specifically, the data and audio/video stream is received by the set-top box 80. This data audio/video stream is received from the head end 50 via the hub 60.

The promotion content agent 230 of the embedded client system 200 monitors the video stream for the embedded trigger signal. When the trigger signal is detected, the promotion content agent 230 inserts the associated graphical promotion content indicated in the event map into the analog or digital video stream to the display 310 of the television 300. As a result, the promotion 320 appears on the display screen 310, overlaying the video.

User selection of this promotion through a selecting device, such as a remote control device, sends a URL to the web browser 210 bringing the browser window to the forefront of the display 310 of the television 300. In this way, user selection of the promotion allows the user to receive and view data from the URL enabling e-commerce transactions.

Therefore, the event-driven activation, as well as the other scheduling options, presents promotions in an appropriate context to further increase the likelihood of consumer e-commerce transactions.

In addition to the initial registration process, the present invention includes a system and method for updating user profiles through uploading distributed user activity and event logs to the system server 100, parsing out the user and device attributes from the logs, and updating the user profiles in the data store 130.

The logs provide useful information, because the logs track a variety of information which the system can use in order to more accurately target users for content and promotional deployment. In one embodiment, the logs track channel events and e-commerce transactions initiated through the display of promotions. In another embodiment, the logs track peripheral events, such as the addition of a joystick and console for gaming purposes, power events, application events, and promotion events. Continuous updating of user profiles through this system and method improves the targeting of consumers for content deployment, and in particular, for promotional content deployment.

In brief overview, the network device includes a logging component 250 that monitors and logs user activity and events in an generic file format. For example, the logging component 250 monitors user activity at a user interface device such as the television remote channel control. In one embodiment, the generic file format is Extensible Markup Language (XML). The format of the log files, using XML, correspond to the structure of the user profiles in the data store 130. This allows for processing of the logs in an automated fashion.

In addition, the user activity and event logs include a description of the structure of the document itself. Using XML, the description of the structure of the document is the Document Type Definition (DTD). Providing a description of the document structure within the logs themselves, allows for the server system 100 to process logs with different document structures. This avoids the necessity of having to update the server system 100 every time a new document structure is used within the logs.

FIG. 5A is an example of a DTD for an event log where each event that occurs is recorded with the GUID of the device, the time of the event, the event type, and a description of the event.

FIG. 5B is an example of an event log written in XML using the DTD of FIG. 5A. The event log contains two events, stored in the structure described by the DTD. FIG. 5B demonstrates how a channel event and an application event are described within this log.

The uploading and parsing of these user activity and event logs will provide additional user attributes for targeting consumers including information regarding responses to prior promotions. If the logs indicate that a user is interested in a particular type of promotion, the system server modifies the user attributes of his user profile such that they match the attributes of a group profile associated with that type of promotion.

Figure 6:
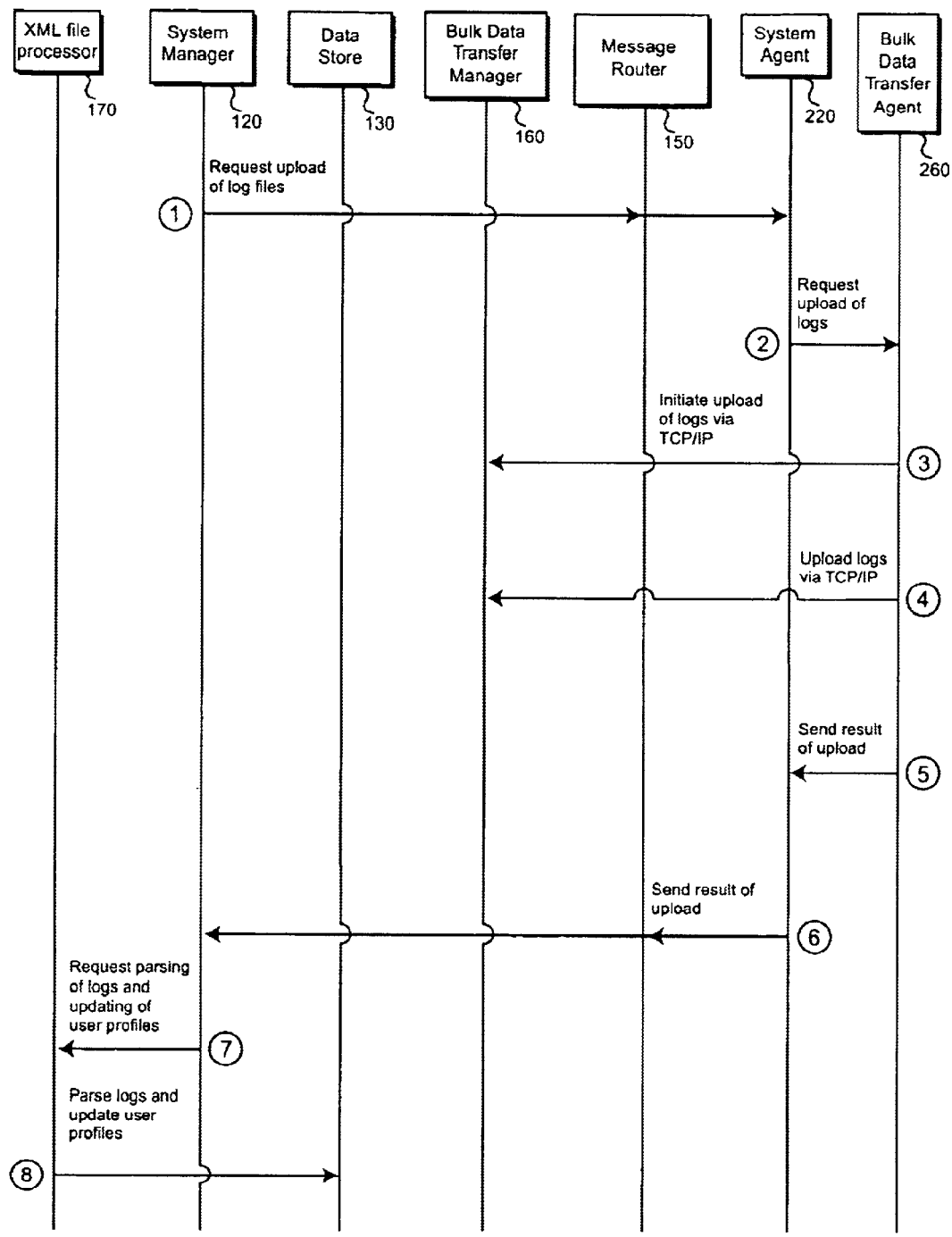
FIG. 6 is a state line diagram illustrating a process for automatically for updating user profiles through uploading and parsing user activity and event logs according to the invention.

FIG. 6 is a state line diagram showing the interaction of the server system 100 and the embedded client system 200 for updating user profiles through the upload and parsing of user activity and event logs.

In step 1, the system manager 120 sends a message to the system agent 220 to upload its activity logs to the server system.

In step 2, the system agent 220 makes a C++ object method call to the bulk data transfer agent 260 to upload the user activity and event logs.

In step 3, the bulk data transfer agent 260 sets up a TCP/IP socket connection to the bulk data transfer manager 160 of the server system to initiate the delivery of the logs.

In step 4, the bulk data transfer agent 260 delivers the logs to the bulk data transfer manager 160 through the TCP/IP socket connection where they are stored in the data store 130.

In cases where the connection is broken, the bulk data transfer agent 260 and the bulk data transfer manager 260 can detect that a connection was broken and will continue the download the content from the point in the transfer where the break occurred.

In step 5, the bulk data transfer agent 260 notifies the system agent 220 the result of the data transfer via a C++ object method call.

In step 6, the system agent 220 sends a message to the system manager 120 indicating the result of the data transfer.

In step 7, the system manager 120 makes a call to the XML file processor 170 to update the user profiles from the user activity and event logs.

In step 8, an XML file processor 170 at the server system parses the logs stored on the database and updates the user attributes of the user profile of the network device. This system and method for scheduling remote uploads of the user activity and event logs provides improves the efficiency for targeting consumers for content and promotion.

There are situations where a user will change the hardware configuration of a network device in order to expand its capabilities. In that situation, the present invention provides a system and method by which the network device notifies the server system 100 of a change to its hardware configuration and, in return, receives the appropriate device drivers to support the new hardware configuration.

Figure 7:
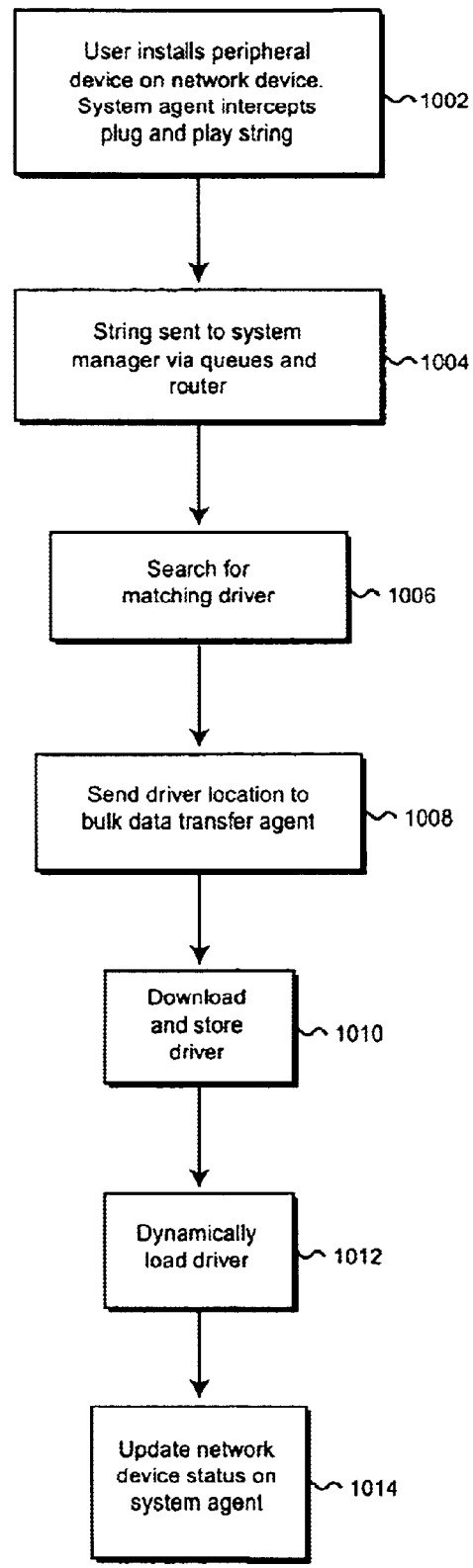
FIG. 7 is a process diagram illustrating a process for dynamically installing a driver on a network device according to the invention.

FIG. 7 shows the dynamic installation of device drivers on the network device according to the present invention.

Specifically, the dynamic driver installation process is triggered when the user installs a peripheral device on a network device for which the network device requires a driver. In the typical example, the process occurs when the user plugs in a peripheral device such as a joy stick into a port such as a serial port or USB (universal serial bus) port.

In step 1002, the system agent 220 intercepts the plug and play string from the peripheral device when it is attached to the USB port.

In step 1004 the system agent 220 then sends this plug and play string to the system manager 120 via the message router 150 and the queue managers along the path between the system agent 220 and the system manager 120.

In step 1006, the system manager 220 then searches for a matching driver in its data store 130. Specifically, it compares the plug and play string received from the network device to plug and play strings of supported operating systems and supporting peripheral devices for which drivers are available.

In step 1008, assuming the valid device driver has been located, the system manager 120 sends a message to the system agent 220 to download the driver providing its location in the data store 130.

In step 1010, the system agent requests the bulk data transfer agent 260 on the network device to download the driver. The bulk data transfer agent 260 then contacts the bulk data transfer manager 160 and downloads and stores the device driver on the network device. In parallel, the system manager 120 instructs the system agent 220 on how to install the device driver on the network device.

In step 1012, in the typical implementation, the device driver is dynamically loaded onto the network device.

In step 1014, when the driver has been successfully installed, the system agent 220 notifies the system manager 120. The system manager, in turn, updates the status of the network device in the system manager's data store 130.

Figure 8:
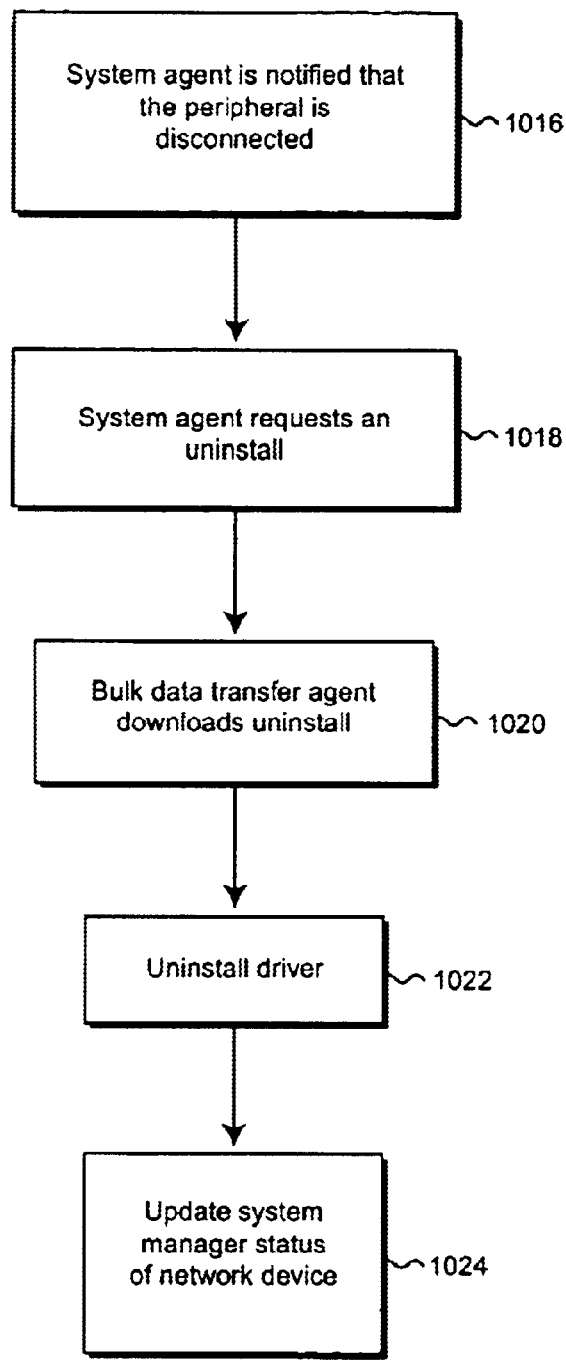
FIG. 8 is a flow diagram showing the uninstallation of the driver on the network device according to the invention.

FIG. 8 illustrates the mirror process in which the peripheral device driver is uninstalled.

In step 1016, the system agent 220 is notified when the peripheral is disconnected by the user from the network device.

In step 1018, the system agent 220 then requests an uninstall program from the system manager 120.

In step 1020, typically, the bulk data transfer agent 260 obtains the uninstalled program from the bulk data transfer manager 160.

In step 1022, the driver is then uninstalled.

In step 1024, upon the successful uninstall, the system agent 220 notifies the system manager 120 that the driver has been installed and the system manager 120 updates the network device's status.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for deploying content to network devices over a data network, comprising:
   a content store that stores the content;
   a bulk data transfer manager that has access to the content store:
   a system manager for scheduling a download of content from the content store to targeted network devices and downloading criteria for activation of the content on the targeted network devices by generating individual scheduling messages to schedule download and activation of targeted content to the targeted network devices;
   each of the scheduling messages containing data that identifies the content to be downloaded to a network device, each of the scheduling messages further containing data that schedules activation of the downloaded content at a time subsequent to content download in a manner free of user intervention;
   the system manager scheduling content download by initiating download of the scheduling messages to the targeted network devices in advance of content activation to cause the network devices to download and activate the content according to the scheduling messages; and
   at each of the targeted network devices, a system agent and a bulk data transfer agent executing in the targeted network device, the system agent receiving one of the scheduling messages delivered from the system manager;
   in response to receiving the scheduling message, the system agent automatically directing the bulk data transfer agent to establish a connection to the bulk data transfer manager and to download the content identified in the scheduling message;
   the bulk data transfer agent initiating a connection to the bulk data transfer manager and requesting the content identified in the scheduling message;
   the bulk data transfer manager downloading the requested content from the content store to the bulk data transfer agent; and
   the system agent activating the downloaded content free of user intervention at a time subsequent to content download according to the data that schedules activation of the content in the scheduling message.

2. A system as recited in claim 1, wherein the system manager selects the targeted network devices among other network devices on the data network based on profile information associated with the network devices.

3. A system as recited in claim 1, wherein the system manager generates the individual scheduling messages to schedule download of the targeted content to the targeted network devices during periods when usage of the data network is typically low.

4. A system as recited in claim 1, wherein the system manager monitors usage of the data network and generates the individual scheduling messages to schedule download of the targeted content when usage of the data network falls below a predetermined level.

5. A system as recited in claim 1, further comprising a management console that provides an interface to identify content for deployment on the network devices, the management console downloading the content to the content store.

6. A system as recited in claim 5, wherein the management console further provides an interface to identify a group profile for targeting the network devices for content deployment, the management console downloading the group profile to the content store.

7. A system as recited in claim 5, wherein the management console further provides an interface for identifying activation criteria for activating the content on the network devices.

8. A system as recited in claim 1, further comprising:
   a system agent executing on the network device; and
   the system manager activating the downloaded content sending a message to the system agent to activate the downloaded content.

9. A system as recited in claim 1, further comprising a system agent executing on the network device, the system agent activating the downloaded content on the network device at a predetermined date and time.

10. A system as recited in claim 1, further comprising a system agent executing on the network device, the system agent activating the downloaded content on the network device in response to an event.

11. A system as recited in claim 10, wherein the event is a channel event.

12. A system as recited in claim 10, wherein the event is an attachment of a peripheral device to the network device.

13. A system as recited in claim 1, further comprising a promotion notification agent executing on the network device; wherein the downloaded content is a promotion;

the promotion notification agent activating the promotion in response to an event.

14. A system as recited in claim 13, wherein the event is a channel event.

15. A system as recited in claim 13, wherein the event is an attachment of a peripheral device to the network device.

16. A system as recited in claim 13, wherein the promotion notification agent activates a plurality of promotions on the network device in response to the event.

17. A system as recited in claim 1, wherein the data network is a cable network.

18. A system as recited in claim 1, wherein the data network is a satellite-linked network.

19. A system as recited in claim 1, wherein the data network is a Digital Subscriber Line network.

20. A system as recited in claim 1, wherein the data network is a wireless network.

21. A system for deploying content to network devices over a data network, comprising:
 a content store that stores the content, the content being promotions;
 a bulk data transfer manager that has access to the content store;
 a system manager for scheduling a download of content from the content store to targeted network devices and downloading criteria for activation of the content on the targeted network devices by generating individual scheduling messages to schedule download and activation of targeted promotions to the targeted network devices;
 each of the scheduling messages containing data that identifies the targeted promotions to be downloaded to a network device, each of the scheduling messages further containing data that schedules activation of the downloaded targeted promotions at a time subsequent to content download in a manner free of user intervention:
 the system manager scheduling promotion download by initiating download of the scheduling messages to the targeted network devices in advance of promotion activation to cause the network devices to download and activate the promotions according to the scheduling messages;
 at each of the targeted network devices, a system agent, a promotion notification agent and a bulk data transfer agent executing in the targeted network device, the system agent receiving one of the scheduling messages delivered from the system manager;
 in response to receiving the scheduling message, the system agent automatically directing the bulk data transfer agent to establish a connection to the bulk data transfer manager and to download the promotions identified in the scheduling message;
 the bulk data transfer agent initiating a connection to the bulk data transfer manager and requesting the promotions identified in the scheduling message;
 the bulk data transfer manager downloading the requested promotion from the content store to the bulk data transfer agent; and
 the promotion notification agent activating the targeted promotions at a time subsequent to promotion download according to the data that schedules activation of the promotions in the scheduling messages.

22. A system as recited in claim 21, wherein the promotion notification agent waits for a message from the system agent to activate the content.

23. A system as recited in claim 21, wherein the promotion notification agent waits for a predetermined date and time established by the activation criteria to activate the content.

24. A system as recited in claim 21, wherein the promotion notification agent monitors user activity and waits for a predetermined user action established by the activation criteria to activate the content.

25. A system as recited in claim 21, wherein the promotion notification agent monitors a video stream for embedded signal established by the activation criteria to activate the content.

26. A system as recited in claim 21, wherein the promotion notification agent monitors a current channel for a television display device and activates the content in response to the current channel.

27. A method for deploying content to network devices over a data network, comprising:
 storing content on a server system on the network;
 generating individual scheduling messages to schedule download and activation of targeted content to a plurality of targeted network devices, each of the scheduling messages containing data that identifies the content to be downloaded to a targeted network device, each of the scheduling messages further containing data that schedules activation of the downloaded content at a time subsequent to content download in a manner free of user intervention;
 scheduling content download by initiating download of the scheduling messages to the plurality of targeted network devices in advance of content activation to cause the targeted network devices to download and activate the content according to the scheduling messages; and
 receiving one of the delivered scheduling messages:
 in response to receiving the scheduling message, automatically establishing a connection in order to download the content targeted in the received scheduling message;
 requesting the content identified in the scheduling message;
 downloading the requested content; and
 activating the downloaded content free of user intervention at a time subsequent to content download according to the data that schedules activation of the content in the scheduling message.

28. A method as recited in claim 27, further comprising selecting the targeted network devices among other network devices on the data network based on profile information associated with the network devices.

29. A method as recited in claim 27, further comprising generating the individual scheduling messages to schedule download of the targeted content to the plurality of targeted network devices during periods when usage of the data network is typically low.

30. A method as recited in claim 27, further comprising:
 monitoring usage of the data network; and
 generating the individual scheduling messages to schedule download of the targeted content to the plurality of targeted network devices when usage of the data network falls below a predetermined level.

31. A method as recited in claim 27, further comprising using a bulk data transfer manager and a bulk data transfer agent to download the content to the network device.

32. A method as recited in claim 27, further comprising an advertiser selecting activation criteria and target group profile via an interface to the server system.

33. A method as recited in claim 27, wherein the step of downloading activation criteria comprises downloading a predetermined activation date and time.

34. A method as recited in claim 27, wherein the step of downloading activation criteria comprises downloading activation event information.

35. A method as recited in claim 27, further comprising activating the content in response to user attachment of a peripheral device to the network device.

36. A method as recited in claim 27, further comprising activating the content in response to a selected channel for a television display device.

37. A method as recited in claim 27, further comprising activating the content in response to a signal embedded in a video stream.

38. A method for deploying content to network devices over a data network, comprising:

storing content on a server system on the network, wherein the content is a promotion;

downloading activation criteria for the promotion on the targeted network devices; and generating individual scheduling messages to schedule download and activation of the promotion to a plurality of targeted network devices, each of the scheduling messages containing data that identifies the promotions to be downloaded to a targeted network device, each of the scheduling messages further containing data that schedules activation of the downloaded promotions at a time subsequent to promotion download in a manner free of user intervention;

scheduling content download by initiating download of the scheduling messages to the plurality of targeted network devices in advance of promotion activation to cause the targeted network devices to download and activate the promotions according to the scheduling messages;

receiving one of the delivered scheduling messages;

in response to receiving the scheduling message, automatically establishing a connection in order to download the promotions targeted in the received scheduling message;

requesting the promotions identified in the scheduling message;

downloading the requested promotions; and activating the downloaded promotions free of user intervention at a time subsequent to content download according to the data that schedules activation of the promotions in the scheduling message.

* * * * *

UNITED STATES PATENT AND TRADEMARK OFFICE
CERTIFICATE OF CORRECTION

PATENT NO. : 6,845,396 B1
DATED : January 18, 2005
INVENTOR(S) : Chaitanya Kanojia et al.

It is certified that error appears in the above-identified patent and that said Letters Patent is hereby corrected as shown below:

Column 11,
Line 21, delete "0.8" and insert -- .8 --

Column 17,
Line 46, delete ":" and insert -- ; --

Column 19,
Line 37, delete ":" and insert -- ; --

Column 20,
Line 34, delete ":" and insert -- ; --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,845,396 B1
DATED : January 18, 2005
INVENTOR(S) : Chaitanya Kanojia et al.

It is certified that error appears in the above-identified patent and that said Letters Patent is hereby corrected as shown below:

Column 11,
Line 21, delete ".8" and insert -- 8 --.

Signed and Sealed this

Twenty-third Day of August, 2005

JON W. DUDAS
*Director of the United States Patent and Trademark Office*